US012800417B2

(12) United States Patent
Haga et al.

(10) Patent No.: US 12,800,417 B2
(45) Date of Patent: Nov. 17, 2026

(54) OPTICAL PRESSURE SENSOR AND MANUFACTURING METHOD THEREFOR

(71) Applicant: ASAHI INTECC CO., LTD., Seto (JP)

(72) Inventors: Yoichi Haga, Sendai (JP); Tadao Matsunaga, Tottori (JP); Tsuyoshi Nakayama, Seto (JP); Kenta Katou, Seto (JP); Kenta Nakamura, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 303 days.

(21) Appl. No.: 18/650,854

(22) Filed: Apr. 30, 2024

(65) Prior Publication Data

US 2024/0280427 A1 Aug. 22, 2024

Related U.S. Application Data

(63) Continuation of application No. PCT/JP2022/032556, filed on Aug. 30, 2022.

(30) Foreign Application Priority Data

Nov. 1, 2021 (JP) ................................ 2021-178475

(51) Int. Cl.

| | |
|---|---|
| ***G01L 11/02*** | (2006.01) |
| ***G01L 1/24*** | (2006.01) |
| ***G01L 9/00*** | (2006.01) |

(52) U.S. Cl.

CPC ............ *G01L 11/025* (2013.01); *G01L 1/242* (2013.01); *G01L 9/0079* (2013.01)

(58) Field of Classification Search

CPC ..... G01L 11/025; G01L 1/242; G01L 9/0079; A61B 2562/12; A61B 5/0215

See application file for complete search history.

(56) References Cited

U.S. PATENT DOCUMENTS 4,933,545 A * 6/1990 Saaski ..................... G01L 11/02 250/231.19
6,328,796 B1 * 12/2001 Kub ....................... C30B 25/02 438/455

(Continued)

FOREIGN PATENT DOCUMENTS

EP 0196784 A2 10/1986
EP 0571107 B1 1/1998

(Continued)

OTHER PUBLICATIONS

Takehito Shimatsu et al. "Room Temperature Bonding of Wafers With Thin Nanocrystalline Metal Films and its Application to Devices Fabrication," Journal of the Japan Society for Precision Engineering, Aug. 5, 2013, vol. 79, No. 8, pp. 710-713.

*Primary Examiner* — Freddie Kirkland, III
(74) *Attorney, Agent, or Firm* — Oliff PLC

(57) ABSTRACT

An optical pressure sensor and a manufacturing method of an optical pressure sensor. The optical pressure sensor includes first and second members, and an optical transmission medium. The first member has a lateral wall portion extending from a first plate-shaped portion of the first member, and joined to a second plate-shaped portion of the second member. An airtight space is defined by the plate-shaped portions and the lateral wall portion. The optical transmission medium is attached to one of the plate-shaped portions on a side opposite to the airtight space side. A first reflective film is formed on the first plate-shaped portion facing the airtight space. The second plate-shaped portion on the first member side includes a first region facing the airtight space, and a second region facing the distal end surface of the lateral wall portion. A second reflective film is formed on the entire first region.

17 Claims, 12 Drawing Sheets

(56) References Cited

U.S. PATENT DOCUMENTS

| | | | | |
|---|---|---|---|---|
| 6,820,487 | B2 * | 11/2004 | Esashi | G01L 9/0077<br>73/705 |
| 7,684,657 | B2 | 3/2010 | Donlagic et al. | |
| 7,697,798 | B2 * | 4/2010 | Lagakos | G01L 9/0077<br>385/5 |
| 10,526,199 | B1 * | 1/2020 | Chen | B81C 1/00285 |
| 11,313,746 | B2 * | 4/2022 | Soeda | G01L 9/0072 |
| 11,454,558 | B2 * | 9/2022 | Zhang | G02B 6/29359 |
| 12,228,459 | B2 * | 2/2025 | Jeyapaul | G08B 17/04 |
| 2004/0031326 | A1 | 2/2004 | Lenzing et al. | |
| 2006/0244970 | A1 * | 11/2006 | Craft | G01L 9/0079<br>356/480 |
| 2009/0202195 | A1 | 8/2009 | Lagakos et al. | |
| 2009/0226128 | A1 * | 9/2009 | Donlagic | G01K 11/3213<br>385/13 |
| 2017/0082514 | A1 * | 3/2017 | Duplain | G01L 19/0046 |
| 2020/0102215 | A1 * | 4/2020 | Chen | B81B 7/0038 |
| 2020/0386635 | A1 * | 12/2020 | Zhang | G01L 1/242 |
| 2023/0030272 | A1 * | 2/2023 | Yamauchi | H10P 72/0428 |

FOREIGN PATENT DOCUMENTS

| | | | |
|---|---|---|---|
| EP | 0997721 | A1 | 5/2000 |
| JP | S61-246641 | A | 11/1986 |
| JP | 3393370 | B2 | 4/2003 |
| JP | 2004-012464 | A | 1/2004 |
| JP | 2005-291945 | A | 10/2005 |
| JP | 2007-532871 | A | 11/2007 |
| JP | 2011-038915 | A | 2/2011 |
| JP | 2018-527592 | A | 9/2018 |
| WO | 2005/098385 | A1 | 10/2005 |
| WO | 2017/049392 | A1 | 3/2017 |

* cited by examiner

OPTICAL PRESSURE SENSOR AND MANUFACTURING METHOD THEREFOR

CROSS-REFERENCE TO RELATED APPLICATIONS

This application is a continuation of International Application No. PCT/JP2022/032556, filed Aug. 30, 2022, which in turn claims the benefit of priority of JP 2021-178475, filed Nov. 1, 2021. The disclosure of the prior applications is hereby incorporated by reference herein in its entirety.

TECHNICAL FIELD

The technique disclosed herein relates to an optical pressure sensor and a manufacturing method therefor.

BACKGROUND

A Fabry-Perot interference-type optical pressure sensor is used to measure, for example, the pressure of a coronary artery for the purpose of determining the coronary fractional flow reserve (FFR) (for example, see Patent Literature 1 and 2).

A Fabry-Perot interference-type optical pressure sensor includes an optical element, which is a box having an airtight space referred to as a cavity formed inside, and an optical transmission medium attached to the optical element. A distal end portion of the optical element constitutes a thin plate-shaped diaphragm portion that is deformed (flexed) in response to an external pressure (for example, the pressure within a coronary artery). The optical element is configured by a member having the diaphragm portion, and other members that are joined to the member.

Furthermore, inside the optical element, two reflective films are formed that face each other (are directly opposing) with the airtight space in between. Specifically, one reflective film is formed on a surface of the diaphragm portion facing the airtight space, and the other reflective film is formed in a position facing the one reflective film with the airtight space in between. The distance between the two reflective films (hereinafter, referred to as "cavity length") changes according to the deformation of the diaphragm portion. Therefore, the cavity length changes according to the external pressure.

The light that enters the airtight space of the optical element via a photoconductive medium undergoes multiple reflections between the two reflective film facing each other, and light interference occurs during the multiple reflections. The interference peak wavelength of the multiple reflections changes according to the cavity length. That is, the interference peak wavelength of the multiple reflections changes according to the external pressure. A Fabry-Perot interference-type optical pressure sensor uses such characteristics to measure the external pressure based on the interference peak wavelength of the multiple reflections of light in the airtight space inside the optical element.

In a related Fabry-Perot interference-type optical pressure sensor, the reflective films are only formed on a center part of the surfaces of the members on which the reflective films are formed that are facing the airtight space, and are not formed on the peripheral edge parts. This is because, in order to avoid the occurrence of joining defects caused by forming the reflective films on a joining surface when joining the two members, the reflective films are only formed on regions having a margin with a predetermined size (such as 20 to 30 μm) from the joining surface.

CITATION LIST

Patent Literature

Patent Literature 1: Japanese Patent No. 3393370
Patent Literature 2: U.S. Pat. No. 7,684,657

SUMMARY

Technical Problem

As mentioned above, in a related Fabry-Perot interference-type optical pressure sensor, because the reflective films are only formed on a center part of the surfaces of the members on which the reflective films are formed that are facing the airtight space, it is not possible to sufficiently improve the reflection intensity of the light by the reflective films in the cavity. Furthermore, in a related Fabry-Perot interference-type optical pressure sensor, a misalignment may occur in the formation positions of the reflective films on the surfaces of the members on which the reflective films are formed that are facing the airtight space, and the positional misalignment may cause an increase or decrease in the background of the interference waveform. As a result, there is a problem that the measurement accuracy of the optical pressure sensor cannot be sufficiently improved in a related Fabry-Perot interference-type optical pressure sensor.

A technique capable of solving the problems described above is disclosed herein.

Solution to Problem

The technique disclosed herein can be realized, for example, as the following aspects.

An optical pressure sensor disclosed herein comprises a first member, a second member, and an optical transmission medium. The first member includes a first plate-shaped portion and a lateral wall portion that extends from the first plate-shaped portion. The second member includes a second plate-shaped portion. The first member and the second member are joined to each other such that the first and second plate-shaped portions face each other, the lateral wall portion has a distal end surface that is joined to a surface of the second plate-shaped portion, and an airtight space is defined by the first and second plate-shaped portions and the lateral wall portion. The optical transmission medium is attached to a surface of one of the first and second plate-shaped portions on a side opposite to a surface on a side of the airtight space. A first reflective film that reflects light transmitted by the optical transmission medium is formed on a surface of the first plate-shaped portion facing the airtight space. A surface of the second plate-shaped portion on a side of the first member includes a first region facing the airtight space, and a second region facing the distal end surface of the lateral wall portion of the first member. A second reflective film that reflects light transmitted by the optical transmission medium is formed on an entirety of the first region.

As described above, in this optical pressure sensor, the second reflective film is formed on the entire first region, which faces the airtight space, on the surface of the second plate-shaped portion on the first member side. As a result, according to this optical pressure sensor, the reflection intensity of light by the second reflective film can be improved, and it is possible to avoid the occurrence of misalignment in the formation position of the second reflective film in the first region on the surface of the second plate-shaped portion on the first member side. Therefore, according to this optical pressure sensor, the measurement accuracy of the optical pressure sensor can be improved.

A manufacturing method of an optical pressure sensor is also disclosed herein. This manufacturing method of an optical pressure sensor includes preparing a first member including a first plate-shaped portion and a lateral wall portion that extends from the first plate-shaped portion, and a second member including a second plate-shaped portion. The first member and the second member are to be joined to each other such that: the first plate-shaped portion faces the second plate-shaped portion; the lateral wall portion has a distal end surface that is joined to a surface of the second plate-shaped portion; and an airtight space is defined by the first and second plate-shaped portions and the lateral wall portion. The method further includes forming a first reflective film that reflects light. The first reflective film is formed at a temperature of −10° C. or higher and 200° C. or lower and under a vacuum of less than standard atmospheric pressure, and is formed of a specific metal on a surface of the first plate-shaped portion that is to be arranged to face the second plate-shaped portion, and on the distal end surface of the lateral wall portion of the first member that is to be arranged to face the second plate-shaped portion. The method also includes forming a second reflective film that reflects light. The second reflective film is formed at a temperature of −10° C. or higher and 200° C. or lower and under a vacuum of less than standard atmospheric pressure, and is formed of the specific metal on a first region and a second region of a surface of the second plate-shaped portion that is to be arranged on a side of the first member. The first region is surrounded by the second region and is entirely covered by the second reflective film, and the second region is to be arranged to face the distal end surface of the lateral wall portion of the first member. The method further includes joining the first member and the second member at a temperature of −10° C. or higher and 200° C. or lower and under a vacuum of less than standard atmospheric pressure, by bringing into contact the distal end surface of the lateral wall portion of the first member, on which the first reflective film has been formed, with the second region of the surface of the second plate-shaped portion, on which the second reflective film has been formed.

In this way, in this manufacturing method of an optical pressure sensor, because the first member and the second member can be joined at a temperature that is not too high, such as −10° C. or higher and 200° C. or lower, it is possible to suppress the occurrence of thermal strain in each member when the optical pressure sensor is manufactured. Furthermore, because a molten material or an adhesive is not used when joining the first member and the second member, it is possible to suppress a decrease in the quality of the optical pressure sensor caused by an outflow of the molten material or the adhesive. In addition, because the first reflective film and the second reflective film can be made to function as a joining material for joining the first member and the second member, it is possible to realize an improvement in the manufacturing efficiency compared to a manufacturing method in which the formation of the reflective films and the formation of the bonding material are performed in separate steps. Also, because it is not necessary to use an acid-based agent when forming the first reflective film and the second reflective film, it is possible to suppress joining defects and a decrease in light transmittance caused by roughness of the surfaces of the first member and the second member.

The technique disclosed herein can be realized as various aspects, such as an optical pressure sensor, as a medical device provided with the optical pressure sensor, or as a manufacturing method thereof.

DETAILED DESCRIPTION

A. Embodiments

Figure 1:
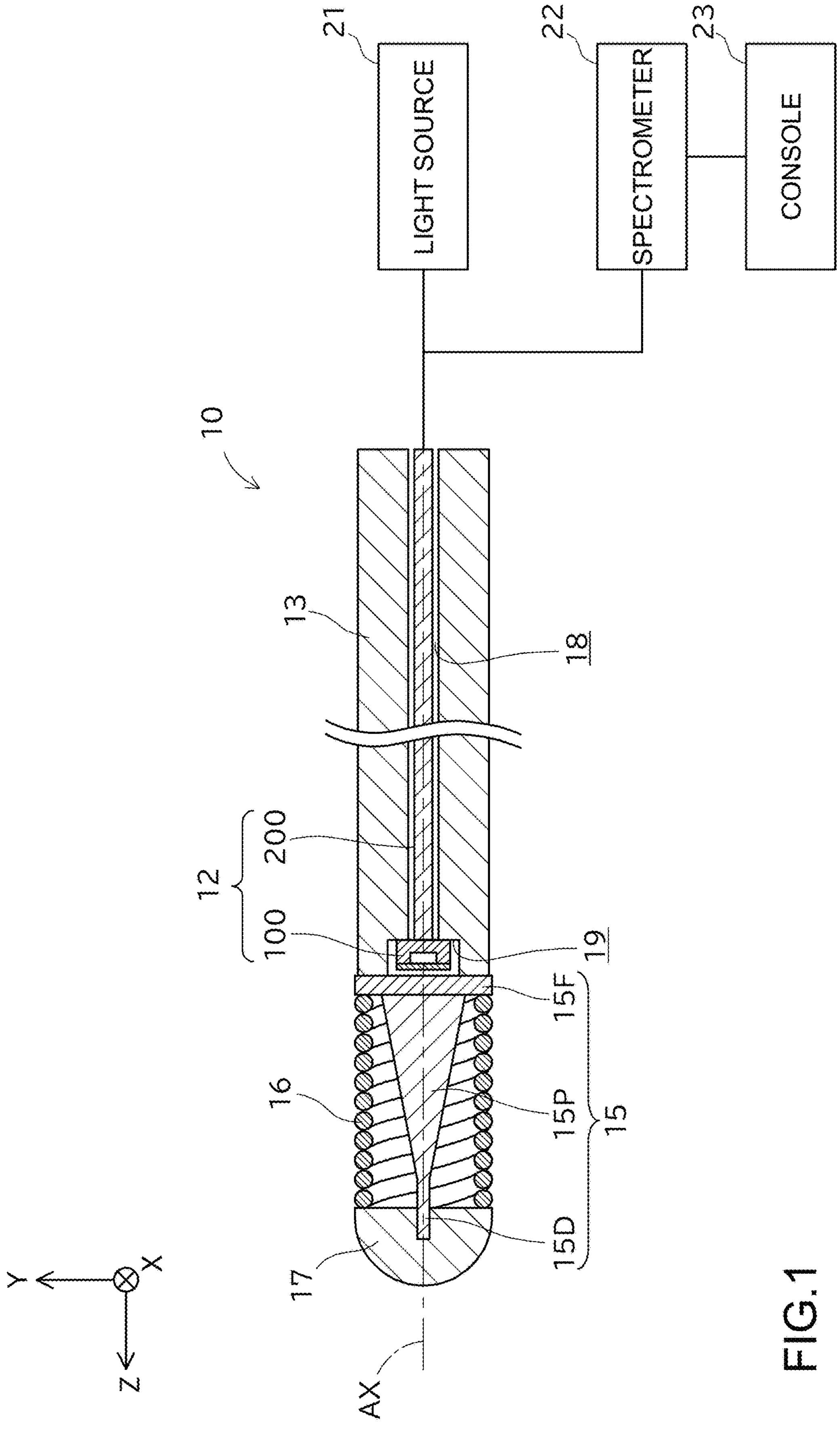
FIG. 1 is an explanatory diagram schematically showing a configuration of a pressure sensor-equipped guide wire according to the present embodiment.

A-1. Configuration of Pressure Sensor-Equipped Guide Wire 10:

FIG. 1 is an explanatory diagram schematically showing a configuration of a pressure sensor-equipped guide wire 10 according to the present embodiment. FIG. 1 shows a configuration of a longitudinal cross-section (YZ cross-section) of the pressure sensor-equipped guide wire 10. In FIG. 1, the positive Z-axis direction side is a distal end side (far side) to be inserted into the body, and the negative Z-axis direction side is a proximal end side (near side) to be operated by an operator such as a physician. In FIG. 1, depiction of a part of the pressure sensor-equipped guide wire 10 is omitted. Furthermore, in FIG. 1, although a state is shown in which the central axis AX of the pressure sensor-equipped guide wire 10 is a straight line that is parallel to the Z-axis direction, the pressure sensor-equipped guide wire 10 is flexible enough to be bent. These points are also the same in the subsequent drawings. Herein, when describing the pressure sensor-equipped guide wire 10 and the constituent members, the end on the distal end side is referred to as a "distal end", the distal end and the vicinity thereof are referred to as a "distal end portion", the end on the proximal end side is referred to as a "proximal end", and the proximal end and the vicinity thereof are referred to as a "proximal end portion".

The pressure sensor-equipped guide wire 10 is a medical device that is inserted inside the body of a patient to measure the pressure. For example, the pressure sensor-equipped guide wire 10 is used to measure the pressure in a coronary artery for the purpose of determining the coronary fractional flow reserve (FFR). Note that the pressure sensor-equipped guide wire 10 may also be used to measure the pressure of other locations in the body (for example, the pressure of a blood vessel in the brain, or the pressure of an organ such as the bile duct). The total length of the pressure sensor-equipped guide wire 10 is, for example, approximately 1,500 to 2,000 mm, and the outer diameter of the pressure sensor-equipped guide wire 10 is, for example, 0.2 to 1 mm.

The pressure sensor-equipped guide wire 10 includes an optical pressure sensor 12, a proximal end side core shaft 13, a distal end side core shaft 15, a coil body 16, and a distal end side joint portion 17.

The proximal end side core shaft 13 is a long member extending along the central axis AX. The outer diameter of the proximal end side core shaft 13 is substantially constant from the proximal end to the distal end. The proximal end side core shaft 13 is formed having a through-hole 18 that passes through from the distal end to the proximal end, and an optical transmission medium 200 of the optical pressure sensor 12 described below is accommodated in the through-hole 18. Furthermore, the distal end of the proximal end side core shaft 13 is formed having a recess 19 that communicates with the through-hole 18, and an optical element 100 of the optical pressure sensor 12 described below is accommodated in a space (housing) formed by the recess 19. A side surface of the distal end portion of the proximal end side core shaft 13 is provided with a window portion (not shown) that communicates with the recess 19, and the optical pressure sensor 12 measures the pressure of the blood flowing into the recess 19 from the window portion. Note that the window portion is provided, for example, in two positions on the upper surface and lower surface of the distal end portion of the proximal end side core shaft 13. The shape of the transverse cross-section (XY cross-section) at each position of the proximal end side core shaft 13 may be any shape but is, for example, a circular shape or a rectangular shape.

The distal end side core shaft 15 is a long member extending along the central axis AX. The distal end side core shaft 15 is configured by a tapered portion 15P whose outer shape gradually becomes smaller from the proximal end to the distal end, a narrow diameter portion 15D that extends toward the distal end side from the distal end of the tapered portion 15P whose outer diameter is substantially constant, and a flange portion 15F that is provided on the proximal end side of the tapered portion 15P. The shape of the transverse cross-section (XY cross-section) at each position of the distal end side core shaft 15 may be any shape but is, for example, a circular shape or a rectangular shape. The flange portion 15F that constitutes the proximal end portion of the distal end side core shaft 15 is joined to the distal end portion of the proximal end side core shaft 13 by, for example, brazing or laser welding.

As the material forming the proximal end side core shaft 13 and the distal end side core shaft 15, for example, stainless steel, Ni—Ti alloy, or piano wire can be used.

The coil body 16 is a hollow cylindrical coil-shaped member in which one or more wires are wound around the outer periphery of the distal end side core shaft 15. The wires constituting the coil body 16 may be configured by single strands, or may be twisted wires in which a plurality of strands are twisted together. The outer diameter of the coil body 16 is substantially constant from the proximal end to the distal end. The proximal end portion of the coil body 16 is joined to the flange portion 15F that constitutes the proximal end portion of the distal end side core shaft 15 by, for example, brazing or laser welding. Furthermore, the distal end portion of the coil body 16 is joined to the distal end portion of the distal end side core shaft 15 via the distal end side joint portion 17. Note that the distal end side joint portion 17 constitutes the most distal end portion of the pressure sensor-equipped guide wire 10, and the outer peripheral surface is a smooth surface (for example, a substantially hemispherical surface).

As the material forming the coil body 16, for example, a radiolucent material such as stainless steel, Ni—Ti alloy, or piano wire, or a radioopaque material such as platinum, gold, tungsten, or an alloy thereof is used. Furthermore, as the material forming the distal end side joint portion 17, for example, a metal solder (such as Au—Sn alloy, Sn—Ag alloy, Sn—Pb alloy, or Pb—Ag alloy), a brazing material (such as aluminum alloy solder, silver solder, or gold solder), or an adhesive (such as an epoxy-based adhesive) is used.

Figure 2:
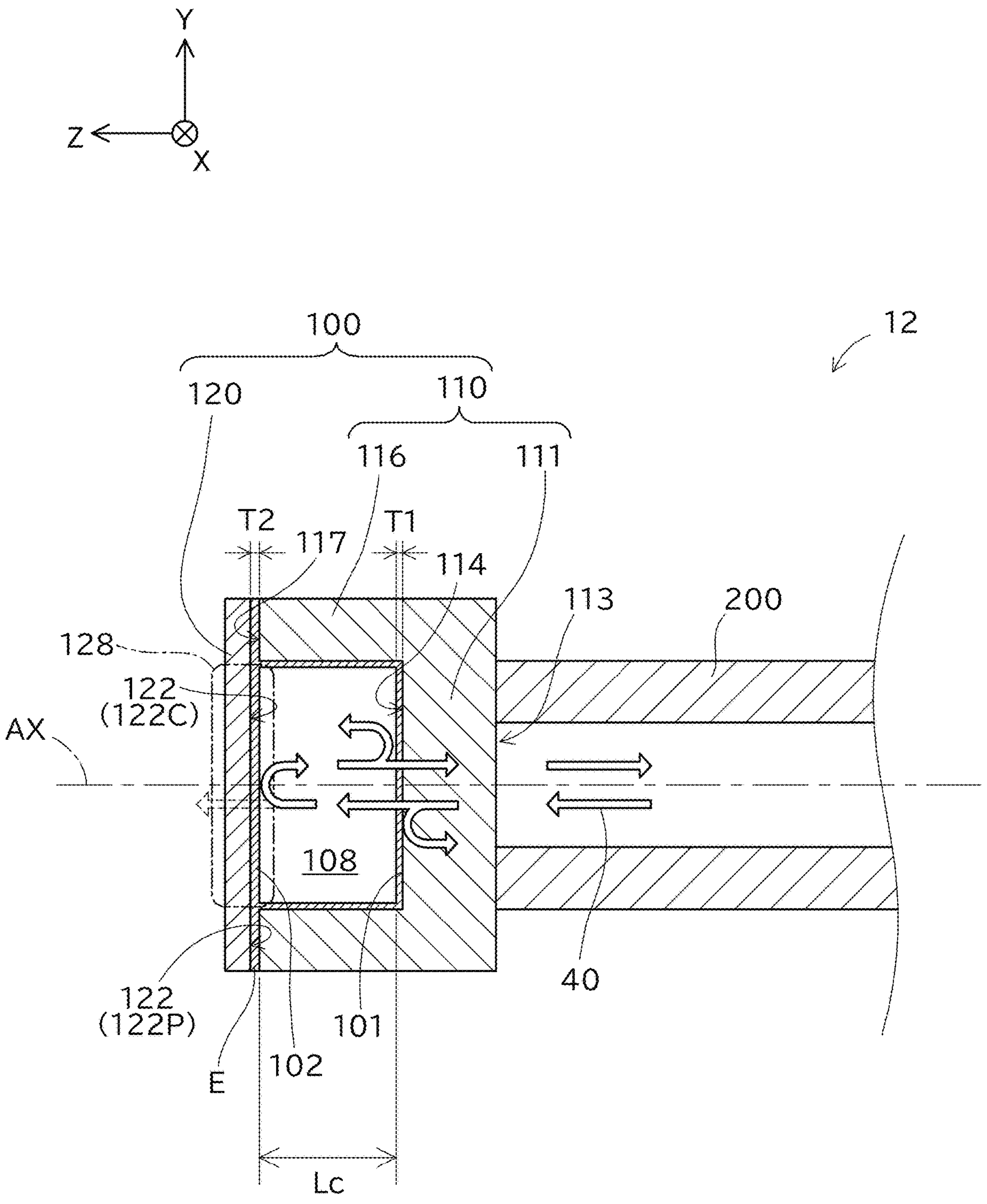
FIG. 2 is an explanatory diagram showing a configuration of an optical pressure sensor.

A-2. Configuration of Optical Pressure Sensor 12:

Next, a configuration of the optical pressure sensor 12 included in the pressure sensor-equipped guide wire 10 will be described. FIG. 2 is an explanatory diagram showing the configuration of the optical pressure sensor 12. FIG. 2 shows a configuration of the longitudinal cross-section (YZ cross-section) of the distal end portion of the optical pressure sensor 12.

The optical pressure sensor 12 of the present embodiment is a Fabry-Perot interference-type pressure sensor. As shown in FIGS. 1 and 2, the optical pressure sensor 12 includes an optical element 100 and an optical transmission medium 200 attached to the optical element 100.

As shown in FIG. 2, the optical element 100 is a substantially cylindrical box having an airtight space 108 referred to as a cavity formed inside. More specifically, the optical element 100 includes a proximal end side member 110 and a distal end side member 120. The proximal end side member 110 is a bottomed cylindrical member. That is, the proximal end side member 110 has a plate-shaped portion 111 having a substantially circular plate-shape that is substantially orthogonal to the central axis AX, and a lateral wall portion 116 that extends from a peripheral edge portion of the plate-shaped portion 111 toward the distal end side by a predetermined length. The lateral wall portion 116 is continuously formed over the entire circumference of the peripheral edge portion of the plate-shaped portion 111. Furthermore, the distal end side member 120 is a substantially circular plate-shaped member that is substantially orthogonal to the central axis AX. In the present embodiment, the outer diameter of the proximal end side member 110 and the outer diameter of the distal end side member 120 are substantially equal. In the present embodiment, the proximal end side member 110 is an example of a first member in the claims, the distal end side member 120 is an example of a second member in the claims, and the entire distal end side member 120 is an example of a plate-shaped portion of a second member in the claims.

A region (referred to as "lateral wall-facing region 122P" below) on the peripheral edge portion of a proximal end side surface (a surface on the proximal end side member 110 side, and referred to as "proximal end side surface 122" below) of the distal end side member 120, and the entire distal end surface 117 of the lateral wall portion 116 of the proximal end side member 110 face each other in the Z-axis direction, and are joined to each other via a proximal end side reflective film 101 and a distal end side reflective film 102 described below that function as joining materials. As a result, the proximal end side member 110 and the distal end side member 120 are joined to each other. The inside of the optical element 100, which is constituted by the proximal end side member 110 and the distal end side member 120 that are joined to each other, is formed having the substantially columnar airtight space 108, which is defined by the plate-shaped portion 111 and the lateral wall portion 116 of the proximal end side member 110, and the distal end side member 120. The inside of the airtight space 108 is in a vacuum state. In the present embodiment, the entire distal end surface 117 of the lateral wall portion 116 of the proximal end side member 110 is an example of a first member side-facing region in the claims, and the lateral wall-facing region 122P of the proximal end side surface 122 of the distal end side member 120 is an example of a second member side-facing region in the claims.

The distal end side member 120 is a very thin plate-shaped member (for example, having a thickness of about 0.5 μm to 10 μm). Therefore, of the distal end side member 120, the part that is not joined to the distal end surface 117 of the lateral wall portion 116 of the proximal end side member 110 (that is, the part facing the airtight space 108) constitutes the diaphragm portion 128 that is deformed (flexed) by an external pressure.

As the material forming the proximal end side member 110 and the distal end side member 120, for example, silicon, quartz glass, or borosilicate glass can be used. The proximal end side member 110 and the distal end side member 120 may each entirely be formed of the same material, or each part may be formed of materials different from each other. Furthermore, the material forming the proximal end side member 110 and the material forming the distal end side member 120 may be the same material, or may be different materials. Note that the material forming the proximal end side member 110 and the distal end side member 120 is preferably a material having a low thermal expansion coefficient and a low elastic modulus from the viewpoint of suppressing temperature drift of the optical pressure sensor 12. Moreover, the material forming the proximal end side member 110 is preferably a material having a high light transmittance. In addition, it is preferable that the material forming the proximal end side member 110 and the material forming the distal end side member 120 have thermal expansion coefficients that are close to each other. From the viewpoint above, it is preferable that the materials forming the proximal end side member 110 and the distal end side member 120 are the same material, and for example, are preferably both quartz glass.

Inside the optical element 100, two reflective films are formed that face each other (are directly opposing) with the airtight space 108 in between. More specifically, the surface (referred to as "bottom surface 114" below) of the plate-shaped portion 111 of the proximal end side member 110 facing the airtight space 108 is formed having the proximal end side reflective film 101. The proximal end side reflective film 101 reflects part of the light that is transmitted by the optical transmission medium 200, and is configured so as to transmit the remaining part. In the present embodiment, the proximal end side reflective film 101 is formed on the entire bottom surface 114 of the plate-shaped portion 111 of the proximal end side member 110. Furthermore, in the present embodiment, the proximal end side reflective film 101 is formed on the inner peripheral surface of the lateral wall portion 116 in addition to the bottom surface 114. In the present embodiment, the proximal end side reflective film 101 is an example of a first reflective film in the claims.

Moreover, the region (a region surrounded by the lateral wall-facing region 122P mentioned above, and referred to as "space-facing region 122C" below) of the proximal end side surface 122 of the distal end side member 120 facing the airtight space 108 is formed having the distal end side reflective film 102. The distal end side reflective film 102 is configured so as to reflect at least part of the light that is transmitted by the optical transmission medium 200. In the present embodiment, the distal end side reflective film 102 is formed on the entire space-facing region 122C of the proximal end side surface 122 of the distal end side member 120. The space-facing region 122C of the proximal end side surface 122 of the distal end side member 120 is, in other words, a surface of the diaphragm portion 128 facing the airtight space 108. As a result, it can be said that the distal end side reflective film 102 is formed on the entire surface of the diaphragm portion 128 facing the airtight space 108. In addition, in the present embodiment, the distal end side reflective film 102 is also formed on the entire lateral wall-facing region 122P in a continuous manner from the space-facing region 122C of the proximal end side surface 122 of the distal end side member 120. That is, in the present embodiment, the entire proximal end side surface 122 of the distal end side member 120 is formed having the distal end side reflective film 102. In the present embodiment, the distal end side reflective film 102 is an example of a second reflective film in the claims, the space-facing region 122C of the proximal end side surface 122 of the distal end side member 120 is an example of a first region in the claims, and the lateral wall-facing region 122P of the proximal end side surface 122 of the distal end side member 120 is an example of a second region in the claims.

The proximal end side reflective film 101 and the distal end side reflective film 102 are formed as films that are substantially orthogonal to the central axis AX, and face each other with the airtight space 108 in between. Hereinafter, the spacing between the proximal end side reflective film 101 and the distal end side reflective film 102 (that is, the height of the airtight space 108 along the central axis AX) is referred to as the cavity length Lc.

The thickness T1 of the proximal end side reflective film 101 and the thickness T2 of the distal end side reflective film 102 are, for example, approximately 1 to 50 nm. However, in the present embodiment, of the proximal end side reflective film 101 and the distal end side reflective film 102, the thickness T2 of the distal end side reflective film 102, which is the reflective film whose distance is further away from the optical transmission medium 200, is thicker than the thickness T1 of the proximal end side reflective film 101, which is the reflective film whose distance is closer to the optical transmission medium 200. Note that, herein, the thickness T1 of the proximal end side reflective film 101 and the thickness T2 of the distal end side reflective film 102 refers to the thicknesses at locations other than the joining surface between the proximal end side member 110 and the distal end side member 120.

The material forming the proximal end side reflective film 101 and the distal end side reflective film 102 is a metal. As such a metal, for example, a metal including at least one of Si, SiC, Al, Cu, Cr, Ni, Ti, and Au can be used. In the present embodiment, the proximal end side reflective film 101 and the distal end side reflective film 102 are formed of the same material. Note that the material forming the proximal end side reflective film 101 and the distal end side reflective film 102 is preferably a material having a low thermal expansion coefficient and a low elastic modulus from the viewpoint of suppressing temperature drift of the optical pressure sensor 12, and further, is a material having a high reflectance from the viewpoint of increasing the reflection intensity. The material forming the proximal end side reflective film 101 and the distal end side reflective film 102 and the thickness are selected according to the optical characteristics required of the optical pressure sensor 12.

The optical transmission medium 200 is a long member for transmitting light, and in the present embodiment, is configured by an optical fiber. The distal end of the optical transmission medium 200 is attached to a surface (hereinafter, referred to as "rear surface 113") on the side opposite to the bottom surface 114 of the plate-shaped portion 111 of the proximal end side member 110 of the optical element 100. Furthermore, as shown in FIG. 1, the proximal end of the optical transmission medium 200 reaches the proximal end of the proximal end side core shaft 13.

As shown in FIG. 1, a light source 21, a spectrometer 22, and a console 23 are connected to the optical transmission medium 200. The light source 21 is a device that emits light toward the optical transmission medium 200. The spectrometer 22 is a device that spectrally separates the incident light from the optical transmission medium 200 and measures the intensity of each wavelength. The console 23 is a device that controls the light source 21 and the spectrometer 22 while converting the intensity signal of each wavelength that is input from the spectrometer 22 into an external pressure value.

Figure 3:
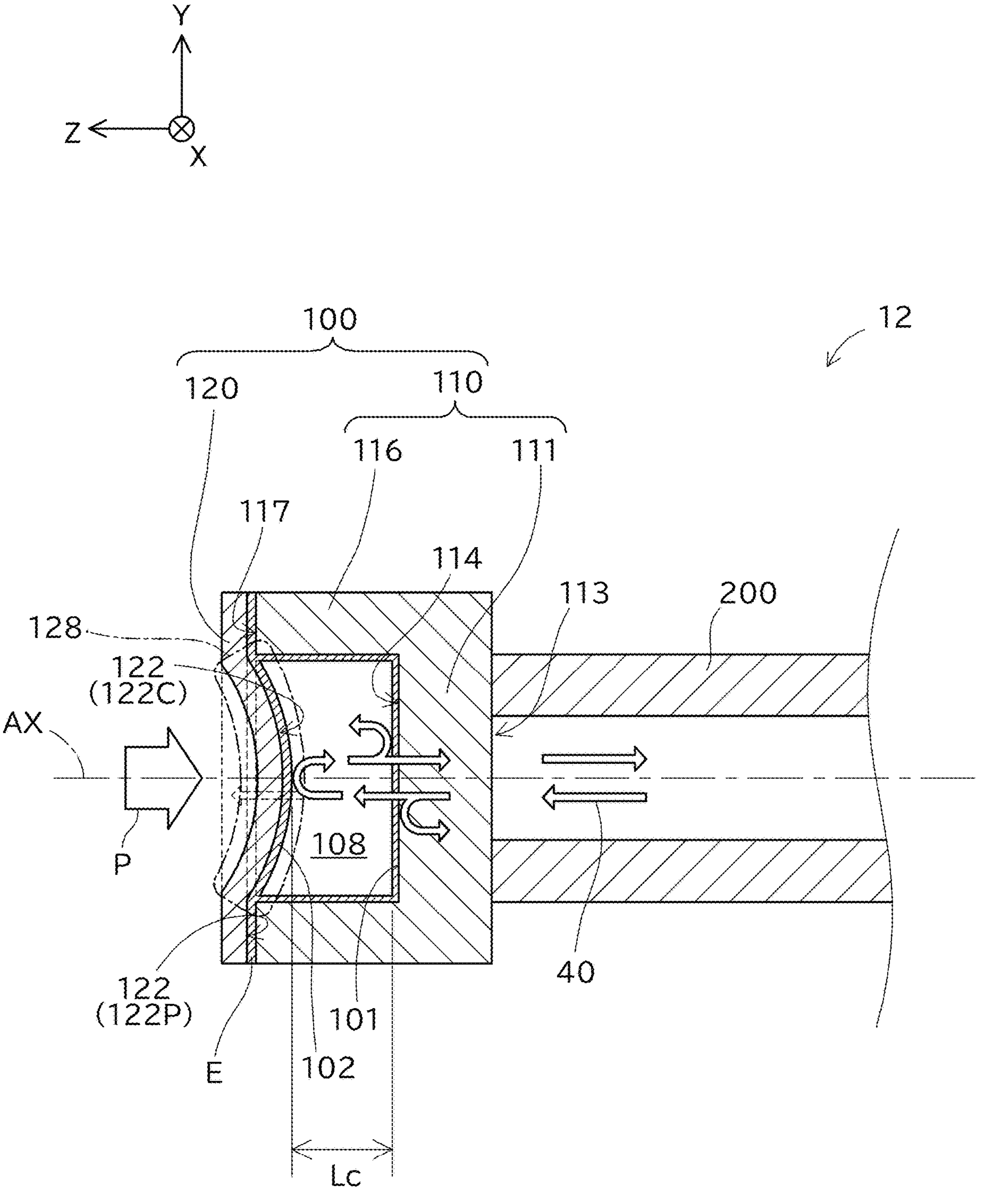
FIG. 3 is an explanatory diagram showing an operation of the optical pressure sensor.

A-3. Operation of Optical Pressure Sensor 12:

Next, the operation of the optical pressure sensor 12 will be described. FIG. 3 is an explanatory diagram showing the operation of the optical pressure sensor 12. FIG. 3 shows a configuration of the longitudinal cross-section (YZ cross-section) of the distal end portion of the optical pressure sensor 12 in a state in which the diaphragm portion 128 is deformed.

As shown in FIGS. 2 and 3, the diaphragm portion 128 of the optical pressure sensor 12 is deformed (flexed) according to an external pressure P. When the diaphragm portion 128 is deformed, the distance (cavity length Lc) between the proximal end side reflective film 101 and the distal end side reflective film 102 provided in the optical element 100 changes. More specifically, as the external pressure P increases, the diaphragm portion 128 is more significantly deformed, and the cavity length Lc becomes a smaller value.

As indicated by the white arrows in FIGS. 2 and 3, at least a portion of the light 40 emitted from the light source 21 (FIG. 1) toward the optical transmission medium 200 is transmitted through the plate-shaped portion 111 of the proximal end side member 110 and the proximal end side reflective film 101 of the optical element 100, and enters the airtight space 108. The light 40 that enters the airtight space 108 undergoes multiple reflections between the proximal end side reflective film 101 and the distal end side reflective film 102. At the time of the multiple reflections, light interference occurs. The interference peak wavelength at this time changes according to the cavity length Lc, that is, the external pressure P. The correspondence relationship between the interference peak wavelength and the external pressure P is set in advance and stored in the console 23.

At least part of the light 40 that undergoes multiple reflections in the airtight space 108 of the optical element 100 is transmitted through the proximal end side reflective film 101 and the plate-shaped portion 111 of the proximal end side member 110, and is once again returned to the inside of the optical transmission medium 200 and input to the spectrometer 22 via the optical transmission medium 200. In the spectrometer 22, the interference peak wavelength of the input light is measured, and the external pressure P is measured based on the interference peak wavelength in the console 23. The measured value of the external pressure P is, for example, displayed on a display unit provided in the console 23.

Figure 4:
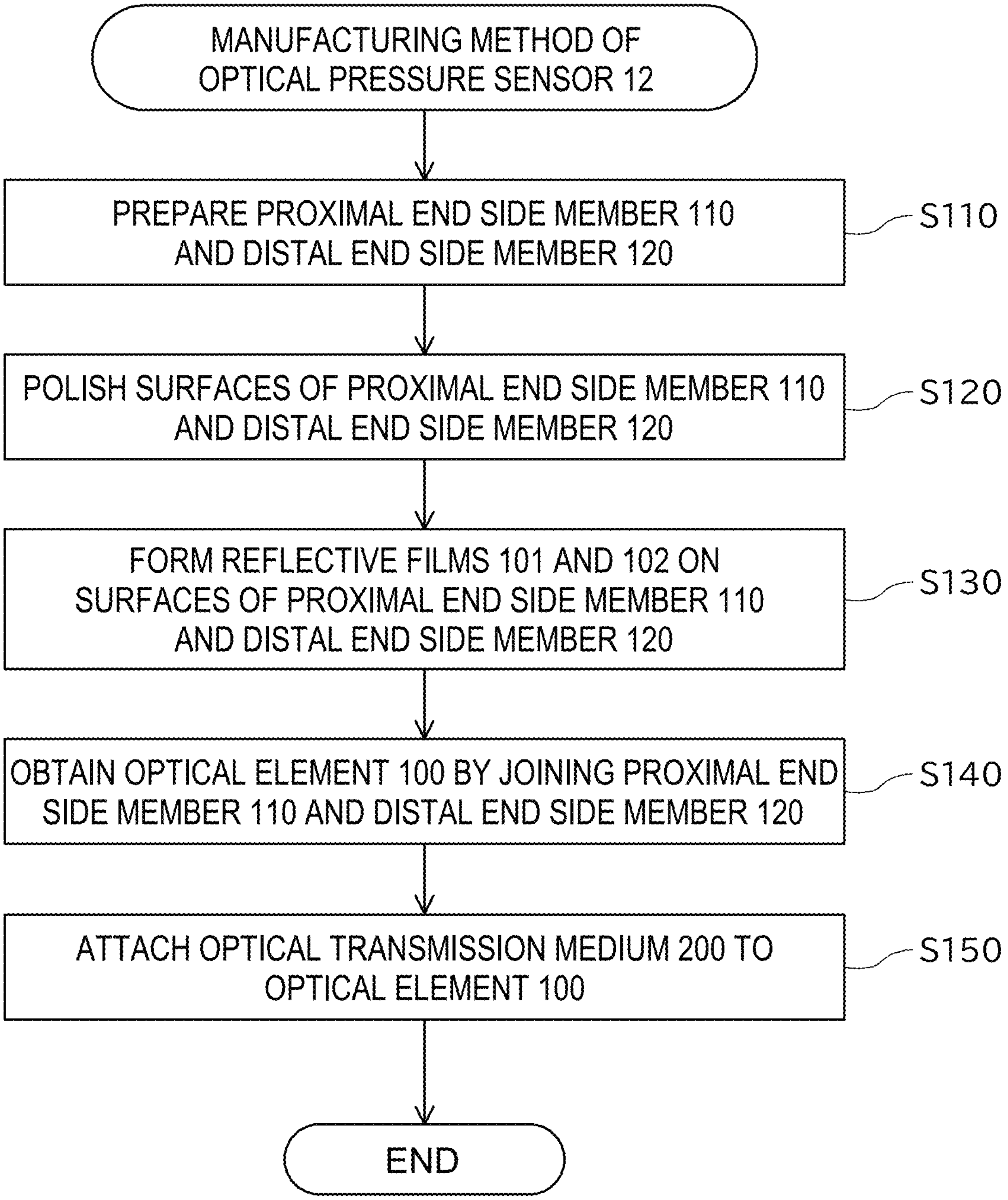
FIG. 4 is a flowchart showing a manufacturing method of the optical pressure sensor.
Figure 5A:
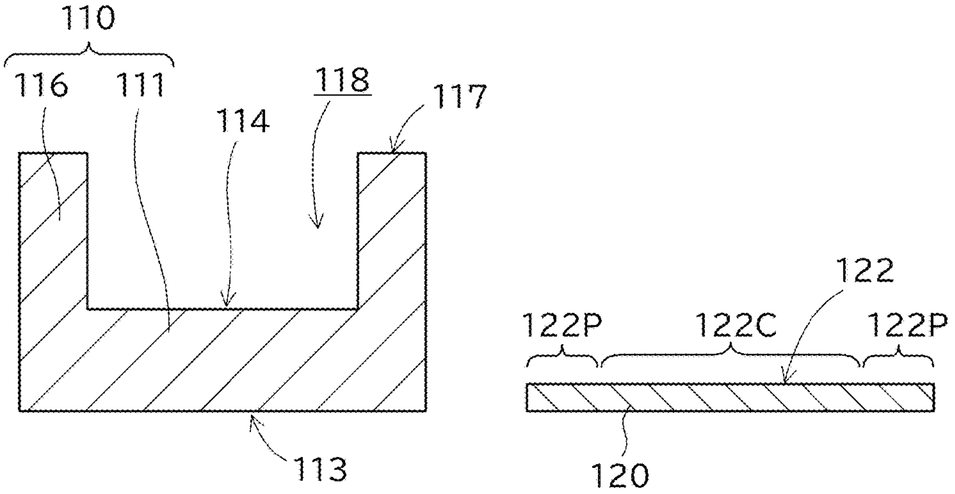
FIGS. 5A-5C are explanatory diagrams schematically showing the manufacturing method of the optical pressure sensor.
Figure 5B:
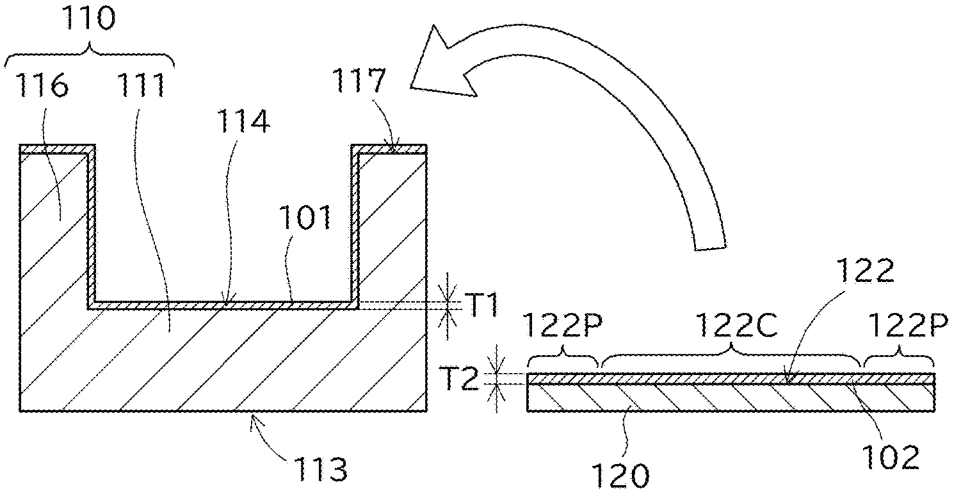
Figure 5C:
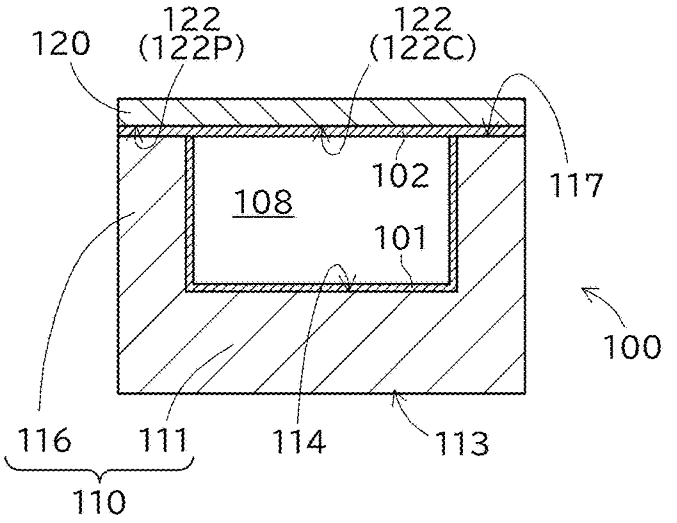

A-4. Manufacturing Method of Optical Pressure Sensor 12:

Next, the manufacturing method of the optical pressure sensor 12 will be described. FIG. 4 is a flowchart showing the manufacturing method of the optical pressure sensor 12, and FIGS. 5A-5C are explanatory diagrams schematically showing the manufacturing method of the optical pressure sensor 12.

First, the proximal end side member 110 and the distal end side member 120 are prepared (S110, see FIG. 5A, referred to as "preparation step" below). The proximal end side member 110 can be prepared, for example, by performing anisotropic etching with respect to a substantially columnar member, and then forming a recess 118 for forming the airtight space 108. The step S110 (preparation step) is an example of a first step in the claims.

Next, the surfaces of the proximal end side member 110 and the distal end side member 120 are polished (S120, referred to as "polishing step" below). The polishing step is, for example, performed by chemical mechanical polishing (CMP). Furthermore, the polishing step is performed with respect to the joining surface between the proximal end side member 110 and the distal end side member 120. That is, the polishing step is at least performed with respect to the distal end surface 117 of the lateral wall portion 116 of the proximal end side member 110, and the lateral wall-facing region 122P of the proximal end side surface 122 of the distal end side member 120. The polishing step may also be performed on other surface regions. Furthermore, the polishing step is performed so that the surface roughness Sa of the surfaces subjected to polishing is less than 50 nm. The polishing step is more preferably performed so that the surface roughness Sa becomes less than 10 nm, and is even more preferably performed so that the surface roughness Sa becomes less than 1 nm. The surface roughness Sa referred to here is an arithmetic average height represented by the following formula (1). In formula (1) below, Z(x, y) is the height at coordinates (x, y), and A is the area in the xy plane. Within step S120 (polishing step), the step of polishing the distal end surface 117 of the lateral wall portion 116 of the proximal end side member 110 is an example of a fifth step in the claims, and the step of polishing the lateral wall-facing region 122P of the proximal end side surface 122 of the distal end side member 120 is an example of a sixth step in the claims.

[Math 1]

$$Sa = \frac{1}{A}\iint_{A} |Z(x, y)|dxdy \tag{1}$$

Next, the proximal end side reflective film 101 is formed on the surface of the proximal end side member 110 and the distal end side reflective film 102 is formed on the surface of the distal end side member 120 at −10° C. or higher and 200° C. or lower and under a vacuum of less than standard atmospheric pressure (S130, see FIG. 5B, referred to as "film forming step" below). The formation of the proximal end side reflective film 101 and the distal end side reflective film 102 is performed, for example, by electron beam evaporation. The formation range of the proximal end side reflective film 101 on the proximal end side member 110 at least includes the entire bottom surface 114 of the plate-shaped portion 111 and the entire distal end surface 117 of the lateral wall portion 116. Note that, in the present embodiment, the proximal end side reflective film 101 is also formed on the inner peripheral surface of the lateral wall portion 116. On the other hand, the formation range of the distal end side reflective film 102 on the distal end side member 120 is, of the proximal end side surface 122 of the distal end side member 120, the entire lateral wall-facing region 122P and the space-facing region 122C, which is the region surrounded by the lateral wall-facing region 122P. That is, in the present embodiment, the formation range of the distal end side reflective film 102 on the distal end side member 120 is the entire proximal end side surface 122. In step S130 (film forming step), the step of forming the proximal end side reflective film 101 is an example of a second step in the claims, and the step of forming the distal end side reflective film 102 is an example of a third step in the claims.

The material forming the proximal end side reflective film 101 and the distal end side reflective film 102 is a metal, and is preferably a metal containing at least one of Si, SiC, Al, Cu, Cr, Ni, Ti, and Au. Furthermore, in the present embodiment, the material forming the proximal end side reflective film 101 and the material forming the distal end side reflective film 102 are the same. In addition, although the formation of the proximal end side reflective film 101 and the formation of the distal end side reflective film 102 are each executed at −10° C. or higher and 200° C. or lower and under a vacuum of less than standard atmospheric pressure, the formation of each reflective film may be executed in a single chamber, or may be executed in individual chambers that are independent of each other. The formation environment of the proximal end side reflective film 101 and the distal end side reflective film 102 is more preferably a vacuum of $10^{-1}$ PA or less, and is even more preferably a vacuum of $10^{-3}$ PA or less. Note that the lower limit of the pressure of the formation environment of the proximal end side reflective film 101 and the distal end side reflective film 102 is a value determined by the device limit. In addition, the formation environment of the proximal end side reflective film 101 and the distal end side reflective film 102 is more preferably 0° C. or higher and 100° C. or lower, and even more preferably 10° C. or higher and 30° C. or lower. Furthermore, it is preferable that heating is not performed when forming the proximal end side reflective film 101 and the distal end side reflective film 102. The film thickness of the proximal end side reflective film 101 and the distal end side reflective film 102 is, for example, 1 to 50 nm. However, in the present embodiment, the thickness T2 of the distal end side reflective film 102 is thicker than the thickness T1 of the proximal end side reflective film 101.

Next, the optical element 100 is obtained as a result of joining the proximal end side member 110 and the distal end side member 120 by bringing into contact, at −10° C. or higher and 200° C. or lower and under a vacuum of less than standard atmospheric pressure, the distal end surface 117 of the lateral wall portion 116 of the proximal end side member 110, on which the proximal end side reflective film 101 has been formed, and the lateral wall-facing region 122P of the proximal end side surface 122 of the distal end side member 120, on which the distal end side reflective film 102 has been formed (S140, see FIG. 5C, referred to as "joining step" below). In this way, in the present embodiment, the joining of the proximal end side member 110 and the distal end side member 120 is realized by atomic diffusion bonding. Atomic diffusion bonding is a joining method that forms a joining thin film under a vacuum, and then uses the surface energy and an atomic rearrangement phenomenon to join two members. In atomic diffusion bonding, it is possible to join members that are formed of an arbitrary material (members formed of the same type of material or members formed of different types of materials) to each other at a relatively low temperature. In the present embodiment, the proximal end side reflective film 101 and the distal end side reflective film 102 are also used as joining thin films in atomic diffusion bonding. That is, the part of the proximal end side reflective film 101 that is formed on the distal end surface 117 of the lateral wall portion 116 of the proximal end side member 110, and the part of the distal end side reflective film 102 that is formed on the lateral wall-facing region 122P of the proximal end side surface 122 of the distal end side member 120 are not made to function as a reflective film (mirror), but are made to function as a joining thin film for joining the proximal end side member 110 and the distal end side member 120. Step S140 (joining step) is an example of a fourth step in the claims.

Note that, although the joining step is executed at −10° C. or higher and 200° C. or lower and under a vacuum of less than standard atmospheric pressure, the formation of the proximal end side reflective film 101 and/or the distal end side reflective film 102 may be consecutively executed in the same chamber, or the formation may be executed once again after temporary removal from the chamber after formation of a reflective film. Furthermore, it is preferable that the environment of the joining step is a vacuum of $10^{-1}$ PA or less. In addition, the environment of the joining step is more preferably 0° C. or higher and 100° C. or lower, and even more preferably 10° C. or higher and 30° C. or lower. Moreover, in the joining step, after stacking the proximal end side member 110 and the distal end side member 120, a predetermined load (for example, a load of about 1 t) may be applied to the stacked body having the proximal end side member 110 and the distal end side member 120.

Finally, the optical transmission medium 200 is attached to the optical element 100 (S150, referred to as "attachment step" below). More specifically, the optical transmission medium 200 is attached to the rear surface 113 of the plate-shaped portion 111 of the proximal end side member 110. The attachment of the optical transmission medium 200 is performed, for example, by an optical adhesive or by fusion bonding. Step S150 (attachment step) is an example of a seventh step in the claims. The optical pressure sensor 12 of the present embodiment can be manufactured mainly through the steps described above.

Note that, although the manufacturing method of a single optical pressure sensor 12 has been described above, it is also possible to manufacture a plurality of optical pressure sensors 12 at the same time. FIGS. 6A-6F explanatory diagrams schematically showing a method of manufacturing a plurality of optical pressure sensors 12 at the same time. In FIGS. 6A-6F, a method of manufacturing six optical pressure sensors 12 at the same time is shown schematically. Hereinafter, a method of manufacturing a plurality of optical pressure sensors 12 at the same time will be briefly described, focusing on the differences from the method of manufacturing a single optical pressure sensor 12 described above.

Figures 6A, 6B, 6C, 6D, 6E, 6F:
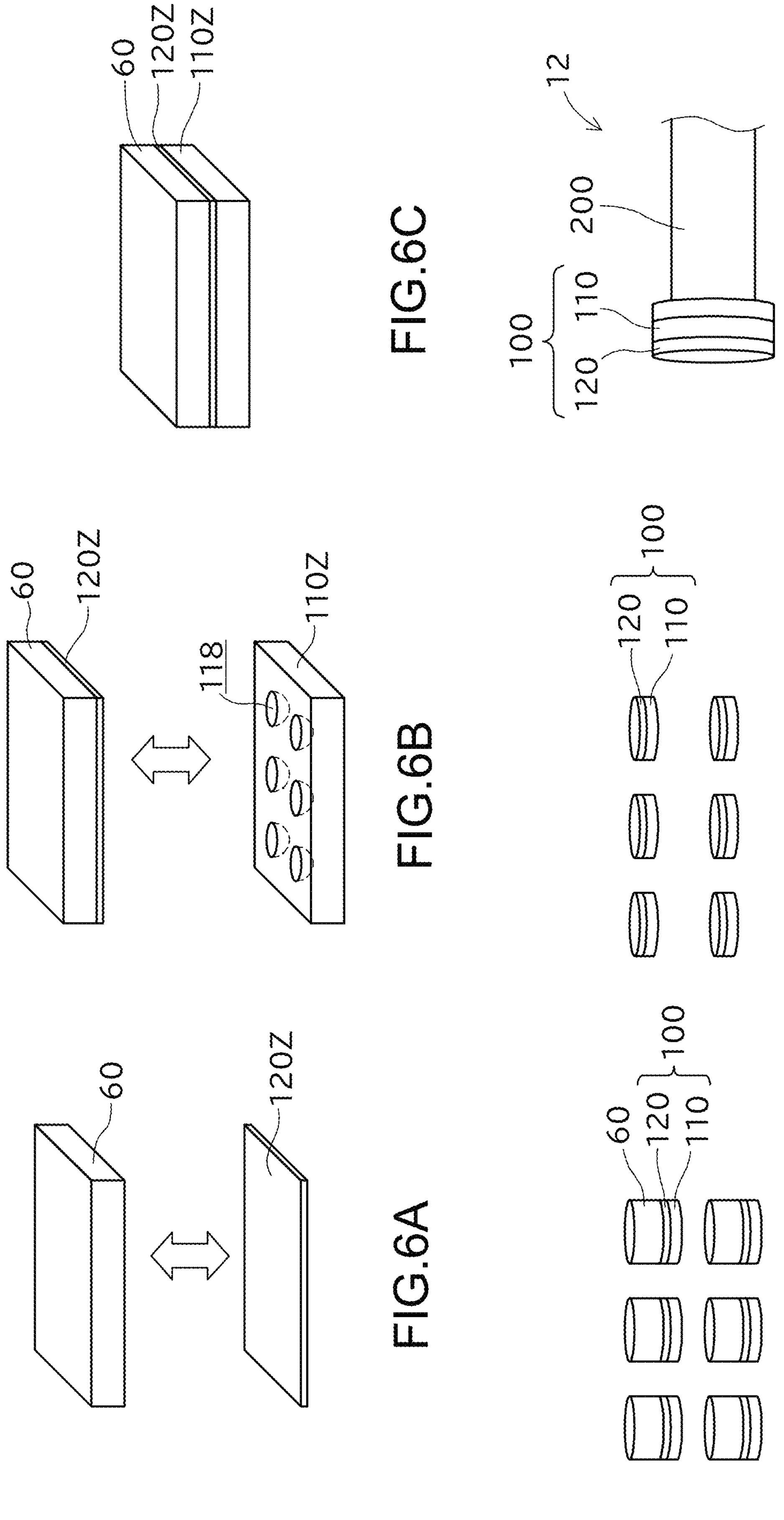
FIGS. 6A-6F are explanatory diagrams schematically showing a method of manufacturing a plurality of optical pressure sensors at the same time.

First, as shown in FIG. 6A, a distal end side member material 120Z, which is the material of the distal end side member 120, is prepared, and a protective substrate 60 is joined to the distal end side member material 120Z to protect the distal end side member 120 during processing. The distal end side member material 120Z is, for example, a flat plate made of quartz glass, and the protective substrate 60 is, for example, a flat plate made of silicon. The joining of the distal end side member material 120Z and the protective substrate 60 can be performed, for example, by atomic diffusion bonding.

Next, as shown in FIG. 6B, a proximal end side member material 110Z, which is the material of the proximal end side member 110, is prepared, and recesses 118 corresponding to the number (six) of optical pressure sensors 12 to be prepared are formed, for example, by etching. The proximal end side member material 110Z is, for example, a flat plate made of quartz glass. Then, the proximal end side reflective film 101 is formed on the surface of the proximal end side member material 110Z and the bottom surface 114 of each recess 118 (see FIG. 5A), the distal end side reflective film 102 is formed on the distal end side member material 120Z, and the proximal end side member material 110Z and the distal end side member material 120Z are stacked. As a result, as shown in FIG. 6C, the proximal end side member material 110Z and the distal end side member material 120Z are joined by atomic diffusion bonding, and a stacked body having the proximal end side member material 110Z, the distal end side member material 120Z, and the protective substrate 60 is obtained.

Next, by performing a cutting process with respect to the stacked body having the proximal end side member material 110Z, the distal end side member material 120Z, and the protective substrate 60, a predetermined number (six) of stacked bodies having the optical element 100, which is configured by the proximal end side member 110 and the distal end side member 120, and the protective substrate 60 are obtained (see FIG. 6D). Then, the optical element 100 is obtained by removing the protective substrate 60 from each of the obtained stacked bodies (see FIG. 6E). Finally, the optical transmission medium 200 is attached to the optical element 100 (see FIG. 6F). As a result of the steps described above, a plurality of (six) optical pressure sensors 12 can be manufactured at the same time. Note that the removal of the protective substrate 60 may be performed after attaching the optical transmission medium 200 to the stacked body (the optical element 100 having the protective substrate 60 attached). Furthermore, if silicon is used as the material forming the protective substrate 60, and silicon is used as the material forming the proximal end side reflective film 101 and the distal end side reflective film 102, because there is a concern that the proximal end side reflective film 101 and the distal end side reflective film 102 may be removed when the protective substrate 60 is removed, Ti or Al may be used as the material forming the proximal end side reflective film 101 and the distal end side reflective film 102 in this case.

A-5. Effects of Present Embodiment:

As described above, the optical pressure sensor 12 constituting the pressure sensor-equipped guide wire 10 of the present embodiment includes the proximal end side member 110 and the distal end side member 120 that constitute the optical element 100, and the optical transmission medium 200. The proximal end side member 110 includes the plate-shaped portion 111. Furthermore, the entire distal end side member 120 functions as a plate-shaped portion. The proximal end side member 110 and the distal end side member 120 are joined in a posture in which the distal end side member 120 and the plate-shaped portion 111 of the proximal end side member 110 are facing each other. The proximal end side member 110 has the lateral wall portion 116 that extends from the plate-shaped portion 111 and that has a distal end surface that is joined to the surface of the distal end side member 120. The airtight space 108 is defined by the plate-shaped portion 111 and the lateral wall portion 116 of the proximal end side member 110, and the distal end side member 120. In addition, the optical transmission medium 200 is attached to the surface (rear surface 113) of the plate-shaped portion 111 of the proximal end side member 110 on the side opposite to the surface (bottom surface 114) on the airtight space 108 side. The bottom surface 114, which is the surface of the plate-shaped portion 111 of the proximal end side member 110 facing the airtight space 108, is formed having the proximal end side reflective film 101 that reflects the light transmitted by the optical transmission medium 200. The proximal end side surface 122, which is the surface of the distal end side member 120 on the proximal end side member 110 side, includes the space-facing region 122C that faces the airtight space 108, and the lateral wall-facing region 122P that faces the distal end surface 117 of the lateral wall portion 116 of the proximal end side member 110, and the entire space-facing region 122C is formed having the distal end side reflective film 102 that reflects the light transmitted by the optical transmission medium 200.

In this way, in the optical pressure sensor 12 of the present embodiment, the entire space-facing region 122C of the proximal end side surface 122 of the distal end side member 120 is formed having the distal end side reflective film 102. Therefore, according to the optical pressure sensor 12 of the present embodiment, as described below, the measurement accuracy of the optical pressure sensor can be sufficiently improved.

Figure 7:
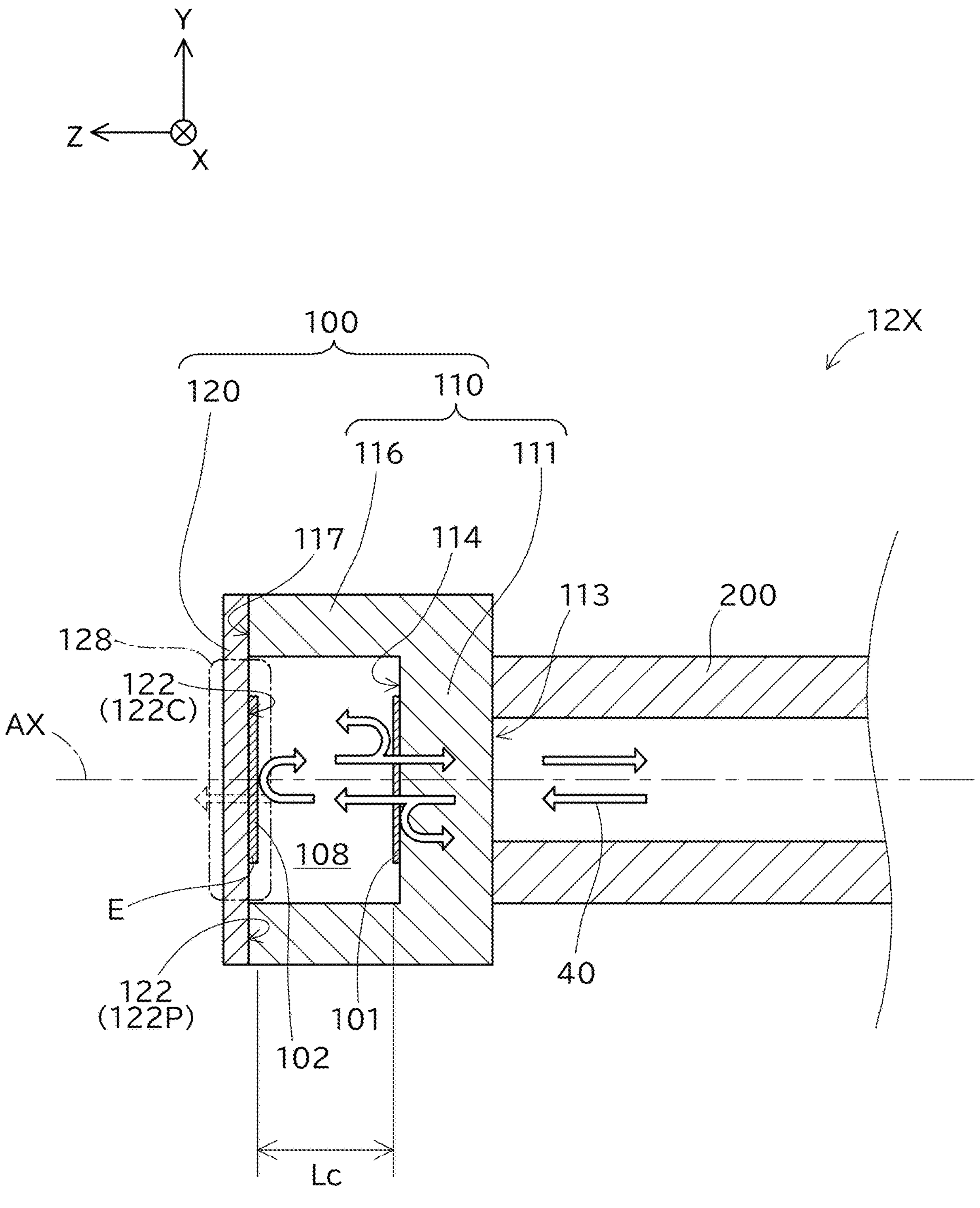
FIG. 7 is an explanatory diagram showing a configuration of an optical pressure sensor of a Comparative Example.

FIG. 7 is an explanatory diagram showing a configuration of an optical pressure sensor 12X of a Comparative Example. In the optical pressure sensor 12X of the Comparative Example, the distal end side reflective film 102 is not formed on the entire space-facing region 122C of the proximal end side surface 122 of the distal end side member 120, but only on part of the center portion, and the distal end side reflective film 102 is not formed on the peripheral edge portion of the space-facing region 122C. This is because, when the optical pressure sensor 12X of the Comparative Example is manufactured, after forming the distal end side reflective film 102 on the distal end side member 120 by, for example, vapor deposition or sputtering, the distal end side member 120 and the proximal end side member 110 are joined using a method such as a melting method or Au—Sn brazing. That is, in this Comparative Example, in order to prevent the occurrence of joining defects due to forming the distal end side reflective film 102 on the joining surface of the distal end side member 120 and the proximal end side member 110, the formation of the distal end side reflective film 102 on the peripheral edge portion of the space-facing region 122C is avoided, and the distal end side reflective film 102 is formed on only the center portion of the space-facing region 122C. Note that, in the optical pressure sensor 12X of the Comparative Example, the proximal end side reflective film 101 is similarly not formed on the entire bottom surface 114 of the plate-shaped portion 111 of the proximal end side member 110, but only on part of the center portion, and the proximal end side reflective film 101 is not formed on the peripheral edge portion of the bottom surface 114.

In this way, in the optical pressure sensor 12X of the Comparative Example, the distal end side reflective film 102 is not formed on the entire space-facing region 122C of the proximal end side surface 122 of the distal end side member 120, but only on part of the center portion. Therefore, in the optical pressure sensor 12X of the Comparative Example, the reflection intensity of light by the distal end side reflective film 102 in the airtight space 108 cannot be sufficiently improved. Furthermore, in the optical pressure sensor 12X of the Comparative Example, there is a concern that a misalignment may occur in the formation position of the distal end side reflective film 102 on the space-facing region 122C of the proximal end side surface 122, and that the background of the interference waveform may increase or decrease due to the misalignment. As a result, according to the optical pressure sensor 12X of the Comparative Example, the measurement accuracy of the optical pressure sensor 12X cannot be sufficiently improved.

In contrast, as shown in FIGS. 2 and 3, in the optical pressure sensor 12 of the present embodiment, the distal end side reflective film 102 is formed on the entire space-facing region 122C of the proximal end side surface 122 of the distal end side member 120. Therefore, the reflection intensity of light by the distal end side reflective film 102 can be sufficiently improved, and the occurrence of a misalignment in the formation position of the distal end side reflective film 102 on the space-facing region 122C of the proximal end side surface 122 can be avoided. Therefore, according to the optical pressure sensor 12 of the present embodiment, the measurement accuracy of the optical pressure sensor 12 can be sufficiently improved.

Furthermore, in the optical pressure sensor 12 of the present embodiment, of the proximal end side reflective film 101 and the distal end side reflective film 102, the thickness T2 of the distal end side reflective film 102, which is the reflective film whose distance is further away from the optical transmission medium 200, is thicker than the thickness T1 of the proximal end side reflective film 101, which is the reflective film whose distance is closer to the optical transmission medium 200. Therefore, the light that undergoes multiple reflections in the airtight space 108 can be suppressed from being transmitted through the distal end side reflective film 102. When the light that undergoes multiple reflections in the airtight space 108 is transmitted through the distal end side reflective film 102, the light passes through the inside of the distal end side member 120 and reaches the distal end surface of the distal end side member 120, is reflected by the distal end surface and once again returns inside the airtight space 108, and the light that has been returned in this manner affects the peak value of the interference wavelength of the multiple reflections in the airtight space 108, and as a result, there is a concern that the measurement accuracy of the optical pressure sensor 12 may be reduced. According to the optical pressure sensor 12 of the present embodiment, the light that undergoes multiple reflections in the airtight space 108 can be suppressed from being transmitted through the distal end side reflective film 102, and therefore, a reduction in the measurement accuracy of the optical pressure sensor 12 can be suppressed. Furthermore, in the optical pressure sensor 12 of the present embodiment, because the thickness T1 of the proximal end side reflective film 101 can be made relatively thin, the amount of light that is transmitted through the proximal end side reflective film 101 and reaches the inside of the airtight space 108 can be increased, and as a result, the peak value of the interference wavelength of the multiple reflections can be increased, and the measurement accuracy of the optical pressure sensor 12 can be improved.

In the optical pressure sensor 12 of the present embodiment, it is preferable that the proximal end side member 110 and the distal end side member 120 are formed of the same material. In this way, the difference in the thermal expansion coefficient between the proximal end side member 110 and the distal end side member 120 can be reduced, and it is possible to suppress a reduction in the measurement accuracy of the optical pressure sensor 12 caused by the difference in the thermal expansion coefficient.

Furthermore, in the optical pressure sensor 12 of the present embodiment, the portion of the distal end side member 120 facing the airtight space 108 constitutes the diaphragm portion 128 that is deformed by an external pressure. As a result, in the optical pressure sensor 12 of the present embodiment, the distal end side reflective film 102 is formed on the entire surface of the diaphragm portion 128 facing the airtight space 108. Therefore, as described below, it is possible to suppress damage to the diaphragm portion 128 or a reduction in the durability of the diaphragm portion 128, and further, it is possible to suppress a decrease in the measurement accuracy of the optical pressure sensor 12.

Therefore, in the optical pressure sensor 12X of the Comparative Example, because the distal end side reflective film 102 is only formed on part of the center portion of the surface (space-facing region 122C) of the diaphragm portion 128 facing the airtight space 108, an edge E of the distal end side reflective film 102 is positioned on the diaphragm portion 128. Therefore, when the diaphragm portion 128 is deformed, a stress is concentrated on the position of the edge E on the distal end side reflective film 102, and there is a concern that the diaphragm portion 128 may be damaged. Furthermore, a residual stress is often generated in the distal end side reflective film 102 of the diaphragm portion 128 during formation of the reflective film, and because the residual stress is concentrated on the position of the edge E of the distal end side reflective film 102, there is a concern that the durability of the diaphragm portion 128 may decrease. Further, when the external temperature changes, because the thermal stress caused by the difference in thermal expansion coefficient between the diaphragm portion 128 and the distal end side reflective film 102 is concentrated on the position of the edge E of the distal end side reflective film 102, the diaphragm portion 128 is more easily deformed, and as a result, there is a concern that a decrease in the measurement accuracy (temperature drift) of the optical pressure sensor 12 may occur.

In contrast, in the optical pressure sensor 12 of the present embodiment, because the distal end side reflective film 102 is formed on the entire surface of the diaphragm portion 128 facing the airtight space 108, the edge E of the distal end side reflective film 102 is not positioned on the diaphragm portion 128. Therefore, according to the optical pressure sensor 12 of the present embodiment, it is possible to suppress a stress from being concentrated on the position of the edge E of the distal end side reflective film 102 when the diaphragm portion 128 is deformed, and it is possible to suppress the diaphragm portion 128 from being damaged. In addition, even when the residual stress is concentrated on the position of the edge E of the distal end side reflective film 102, it is possible to suppress a decrease in the durability of the diaphragm portion 128. Further, when the external temperature changes, even if the thermal stress caused by the difference in thermal expansion coefficient between the diaphragm portion 128 and the distal end side reflective film 102 is concentrated on the position of the edge E of the distal end side reflective film 102, it is possible to avoid the diaphragm portion 128 from becoming more easily deformed, and it is possible to suppress the occurrence of a decrease in the measurement accuracy (temperature drift) of the optical pressure sensor 12.

Furthermore, in the optical pressure sensor 12 of the present embodiment, the distal end side reflective film 102 is also formed on the lateral wall-facing region 122P in a continuous manner from the space-facing region 122C of the proximal end side surface 122 of the distal end side member 120. In other words, the distal end side reflective film 102 is also formed on the joining surface of the distal end side member 120 with the proximal end side member 110 in a continuous manner from the surface of the diaphragm portion 128 facing the airtight space 108. Therefore, the edge E of the distal end side reflective film 102 is not positioned on the outer peripheral edge of the diaphragm portion 128, and is positioned further on the outer peripheral side than the outer peripheral edge of the diaphragm portion 128. Therefore, according to the optical pressure sensor 12 of the present embodiment, it is possible to effectively suppress a stress from being concentrated on the position of the edge E of the distal end side reflective film 102 when the diaphragm portion 128 is deformed, and it is possible to effectively suppress the diaphragm portion 128 from being damaged. In addition, even when the residual stress is concentrated on the position of the edge E of the distal end side reflective film 102, it is possible to effectively suppress a decrease in the durability of the diaphragm portion 128. Further, when the external temperature changes, even if the thermal stress caused by the difference in thermal expansion coefficient between the diaphragm portion 128 and the distal end side reflective film 102 is concentrated on the position of the edge E of the distal end side reflective film 102, it is possible to effectively avoid the diaphragm portion 128 from becoming more easily deformed, and it is possible to effectively suppress the occurrence of a decrease in the measurement accuracy (temperature drift) of the optical pressure sensor 12.

Furthermore, the manufacturing method of an optical pressure sensor 12 of the present embodiment includes the preparation step (S110), the film forming step (S130), and the joining step (S140). The preparation step (S110) is a step for preparing the proximal end side member 110 and the distal end side member 120. The film forming step (S130) includes a step for forming the proximal end side reflective film 101 that reflects light, the proximal end side reflective film 101 being formed at −10° C. or higher and 200° C. or lower and under a vacuum of less than standard atmospheric pressure, and formed of the specific metal on the bottom surface 114, which is a surface of the plate-shaped portion 111 of the proximal end side member 110 facing the distal end side member 120, and a region of the distal end surface 117 of the lateral wall portion 116 of the proximal end side member 110 facing the distal end side member 120 (the entire distal end surface 117).

Furthermore, the film forming step (S130) includes a step for forming the distal end side reflective film 102 that reflects light, the distal end side reflective film 102 being formed at −10° C. or higher and 200° C. or lower and under a vacuum of less than standard atmospheric pressure, and formed of the specific metal and, of the proximal end side surface 122, which is a surface of the distal end side member 120 on the proximal end side member 110 side, is formed on the lateral wall-facing region 122P facing the distal end surface 117 of the lateral wall portion 116 of the proximal end side member 110, and on the entire space-facing region 122C surrounded by the lateral wall-facing region 122P. The joining step (S140) is a step for joining the proximal end side member 110 and the distal end side member 120 by bringing into contact, at −10° C. or higher and 200° C. or lower and under a vacuum of less than standard atmospheric pressure, the distal end surface 117 of the lateral wall portion 116 of the proximal end side member 110, on which the proximal end side reflective film 101 has been formed, and the lateral wall-facing region 122P of the proximal end side surface 122 of the distal end side member 120, on which the distal end side reflective film 102 has been formed.

In this way, in the manufacturing method of the optical pressure sensor 12 of the present embodiment, because the proximal end side member 110 and the distal end side member 120 are joined at a temperature that is not too high, such as −10° C. or higher and 200° C. or lower, it is possible to suppress the occurrence of thermal strain in each member when the optical pressure sensor 12 is manufactured. Furthermore, because a molten material or an adhesive is not used when joining the proximal end side member 110 and the distal end side member 120, it is possible to suppress a decrease in quality of the optical pressure sensor 12 caused by an outflow of the molten material or the adhesive. In addition, because the proximal end side reflective film 101 and the distal end side reflective film 102 can be made to function as a joining material for joining the proximal end side member 110 and the distal end side member 120, it is possible to realize an improvement in the manufacturing efficiency compared to a manufacturing method in which the formation of the reflective films and the formation of the joining material are performed in separate steps. Furthermore, because it is not necessary to use an acid-based agent when forming the proximal end side reflective film 101 and the distal end side reflective film 102, it is possible to suppress joining defects and a decrease in light transmittance caused by roughness of the surfaces of the proximal end side member 110 and the distal end side member 120 due to the acid-based agent.

Furthermore, the manufacturing method of the optical pressure sensor 12 of the present embodiment further includes the polishing step (S120). The polishing step (S120) includes a step for polishing the distal end surface 117 of the lateral wall portion 116 of the proximal end side member 110 prior to the film forming step (S130). Furthermore, the polishing step (S120) includes a step for polishing the lateral wall-facing region 122P of the proximal end side surface 122 of the distal end side member 120 prior to the film forming step (S130). Therefore, according to the manufacturing method of the optical pressure sensor 12 of the present embodiment, the joining strength between the distal end surface 117 of the lateral wall portion 116 of the proximal end side member 110 and the proximal end side reflective film 101, and the joining strength between the lateral wall-facing region 122P of the proximal end side surface 122 of the distal end side member 120 and the distal end side reflective film 102 can be improved, and as a result, the joining strength between the proximal end side member 110 and the distal end side member 120 can be improved. Note that the polishing step (S120) is a step for polishing the distal end surface 117 of the lateral wall portion 116 of the proximal end side member 110 and the lateral wall-facing region 122P of the proximal end side surface 122 of the distal end side member 120 so that the surface roughness Sa becomes less than 50 nm. Therefore, according to the manufacturing method of the optical pressure sensor 12 of the present embodiment, the joining strength between the distal end surface 117 of the lateral wall portion 116 of the proximal end side member 110 and the proximal end side reflective film 101, and the joining strength between the lateral wall-facing region 122P of the proximal end side surface 122 of the distal end side member 120 and the distal end side reflective film 102 can be effectively improved, and as a result, the joining strength between the proximal end side member 110 and the distal end side member 120 can be effectively improved.

In addition, the manufacturing method of the optical pressure sensor 12 of the present disclosure further includes an attachment step (S150) for attaching, after the joining step (S140) the optical transmission medium 200 to the rear surface 113, which is a surface on the side opposite to the surface of the proximal end side member 110 on the airtight space 108 side. Moreover, in the film forming step (S130), of the proximal end side reflective film 101 and the distal end side reflective film 102, the thickness T2 of the distal end side reflective film 102, which is the reflective film whose distance is further away from the optical transmission medium 200 in the state after the attachment step (S150), is thicker than the thickness T1 of the proximal end side reflective film 101, which is the reflective film whose distance is closer to the optical transmission medium 200. Therefore, according to the manufacturing method of the optical pressure sensor 12 of the present embodiment, in the manufactured optical pressure sensor 12, the light that undergoes multiple reflections in the airtight space 108 can be suppressed from being transmitted through the distal end side reflective film 102, and therefore, a reduction in the measurement accuracy of the optical pressure sensor 12 can be suppressed. Furthermore, according to the manufacturing method of the optical pressure sensor 12 of the present embodiment, because the thickness T1 of the proximal end side reflective film 101 can be made relatively thin, the amount of light that is transmitted through the proximal end side reflective film 101 and reaches the inside of the airtight space 108 can be increased, and as a result, the peak value of the interference wavelength of the multiple reflections can be increased, and the measurement accuracy of the optical pressure sensor 12 can be improved.

Furthermore, in the manufacturing method of the optical pressure sensor 12 of the present embodiment, it is preferable that the specific metal, which is the material forming the proximal end side reflective film 101 and the distal end side reflective film 102 that are formed in the film forming step (S130), includes at least one of Si, SiC, Al, Cu, Cr, Ni, Ti, and Au. In this way, the proximal end side member 110 and the distal end side member 120 can be joined with more certainty at a temperature that is not excessively high, such as −10° C. or higher and 200° C. or lower.

Moreover, in the manufacturing method of the optical pressure sensor 12 of the present embodiment, it is preferable that the proximal end side member 110 and the distal end side member 120 are formed of the same material. In this way, in the manufactured optical pressure sensor 12, the difference in the thermal expansion coefficient between the proximal end side member 110 and the distal end side member 120 can be reduced, and it is possible to suppress a reduction in the measurement accuracy of the optical pressure sensor 12 caused by the difference in the thermal expansion coefficient.

B. Second Embodiment

Figure 8:
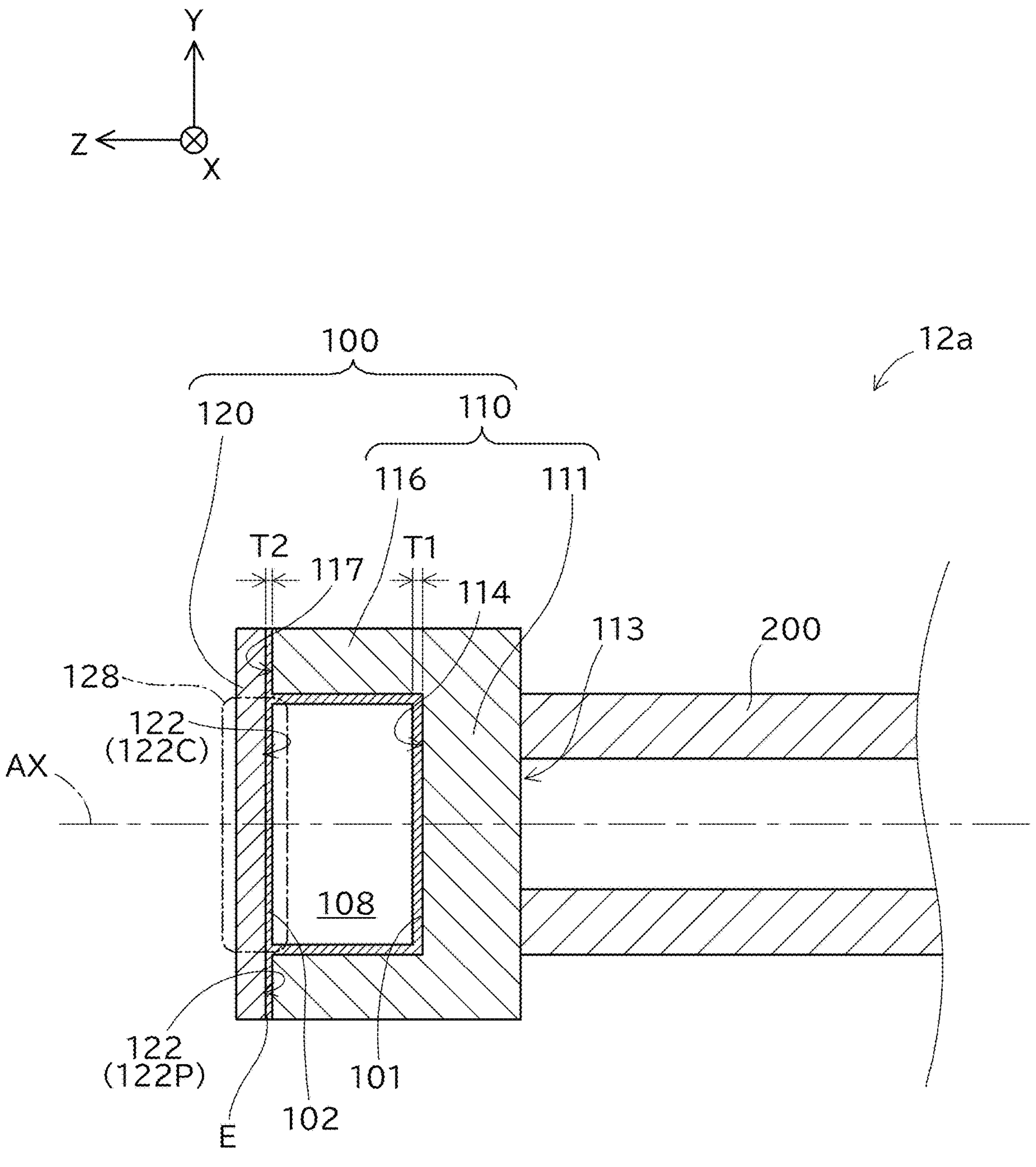
FIG. 8 is an explanatory diagram schematically showing a configuration of an optical pressure sensor according to a second embodiment.

FIG. 8 is an explanatory diagram schematically showing a configuration of an optical pressure sensor 12*a* according to a second embodiment. Hereinafter, components of the optical pressure sensor 12*a* of the second embodiment that are the same as those of the optical pressure sensor 12 of the first embodiment described above will be given the same reference symbols, and the descriptions will be omitted.

In the optical pressure sensor 12*a* according to the second embodiment, the magnitude relationship between the thicknesses of the proximal end side reflective film 101 and the distal end side reflective film 102 is different to that of the optical pressure sensor 12 according to the first embodiment. Specifically, in the optical pressure sensor 12*a* of the second embodiment, of the proximal end side reflective film 101 and the distal end side reflective film 102, the thickness T1 of the proximal end side reflective film 101, which is the reflective film whose distance is closer to the optical transmission medium 200, is thicker than the thickness T2 of the distal end side reflective film 102, which is the reflective film whose distance further away from the optical transmission medium 200.

In this way, in the optical pressure sensor 12*a* of the second embodiment, of the proximal end side reflective film 101 and the distal end side reflective film 102, the thickness T1 of the proximal end side reflective film 101, which is the reflective film whose distance is closer to the optical transmission medium 200, is thicker than the thickness T2 of the distal end side reflective film 102, which is the reflective film whose distance is further away from the optical transmission medium 200. As a result, the distal end side reflective film 102 formed on the diaphragm portion 128, which is a very thin plate-shaped part, can be made relatively thin, and the thermal stress caused by the difference in thermal expansion between the diaphragm portion 128 and the distal end side reflective film 102 can be reduced, and as a result, the occurrence of a decrease in the measurement accuracy of the optical pressure sensor 12*a* caused by the thermal stress (temperature drift) can be suppressed.

C. Third Embodiment

Figure 9:
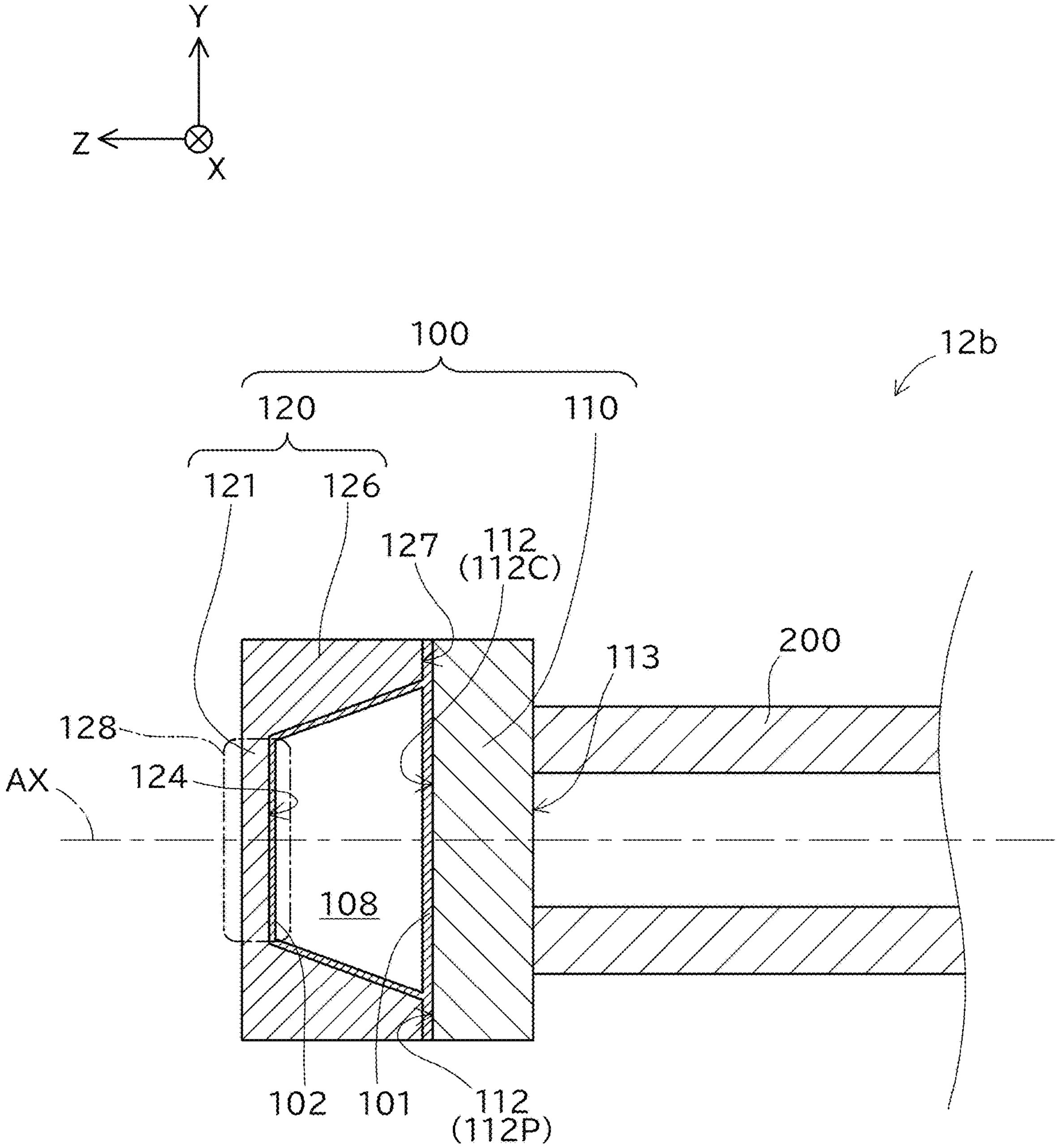
FIG. 9 is an explanatory diagram schematically showing a configuration of an optical pressure sensor according to a third embodiment.

FIG. 9 is an explanatory diagram schematically showing a configuration of an optical pressure sensor 12*b* according to a third embodiment. Hereinafter, components of the optical pressure sensor 12*b* of the third embodiment that are the same as those of the optical pressure sensor 12 of the first embodiment described above will be given the same reference symbols, and the descriptions will be omitted.

In the optical pressure sensor 12*b* according to the third embodiment, the configuration of the proximal end side member 110 and the distal end side member 120 constituting the optical element 100 is different to that of the optical pressure sensor 12 according to the first embodiment. That is, in the optical pressure sensor 12*b* according to the third embodiment, in contrast to the first embodiment described above, the proximal end side member 110 is a substantially circular plate-shaped member, and the distal end side member 120 is a bottomed cylindrical member.

More specifically, the distal end side member 120 has a plate-shaped portion 121 having a substantially circular plate-shape that is substantially orthogonal to the central axis AX, and a lateral wall portion 126 that extends from a peripheral edge portion of the plate-shaped portion 121 toward the proximal end side by a predetermined length. The lateral wall portion 126 is continuously formed over the entire circumference of the peripheral edge portion of the plate-shaped portion 121. Furthermore, the proximal end side member 110 is a substantially circular plate-shaped member that is substantially orthogonal to the central axis AX. In the present embodiment, the distal end side member 120 is an example of a first member in the claims, the proximal end side member 110 is an example of a second member in the claims, and the entire proximal end side member 110 is an example of a plate-shaped portion of a second member in the claims.

A region (referred to as "lateral wall-facing region 112P" below) on the peripheral edge portion of a proximal end side surface (a surface on the distal end side member 120 side, and referred to as "distal end side surface 112" below) of the proximal end side member 110, and the entire distal end surface 127 of the lateral wall portion 126 of the distal end side member 120 face each other in the Z-axis direction, and are joined to each other via the proximal end side reflective film 101 and the distal end side reflective film 102 that function as a joining material. As a result, the proximal end side member 110 and the distal end side member 120 are joined to each other. The inside of the optical element 100, which is constituted by the proximal end side member 110 and the distal end side member 120 that are joined to each other, is formed having the airtight space 108, which is defined by the plate-shaped portion 121 and the lateral wall portion 126 of the distal end side member 120, and the proximal end side member 110. The entire distal end surface 127 of the lateral wall portion 126 of the distal end side member 120 is an example of a first member side-facing region in the claims, and the lateral wall-facing region 112P of the distal end side surface 112 of the proximal end side member 110 is an example of a second member side-facing region in the claims.

The center portion (part facing the airtight space 108) of the plate-shaped portion 121 of the distal end side member 120 is a very thin plate-shaped member, and constitutes the diaphragm portion 128 that is deformed (flexed) due to an external pressure.

Inside the optical element 100, two reflective films are formed that face each other (are directly opposing) with the airtight space 108 in between. More specifically, the region (a region surrounded by the lateral wall-facing region 112P mentioned above, and referred to as "space-facing region 112C" below) of the distal end side surface 112 of the proximal end side member 110 facing the airtight space 108 is formed having the proximal end side reflective film 101. The proximal end side reflective film 101 reflects part of the light that is transmitted by the optical transmission medium 200, and is configured so as to transmit the remaining part. In the present embodiment, the proximal end side reflective film 101 is formed on the entire space-facing region 112C of the distal end side surface 112 of the proximal end side member 110. In addition, in the present embodiment, the proximal end side reflective film 101 is also formed on the entire lateral wall-facing region 112P in a continuous manner from the space-facing region 112C of the distal end side surface 112 of the proximal end side member 110. That is, in the present embodiment, the entire distal end side surface 112 of the proximal end side member 110 is formed having the proximal end side reflective film 101. The proximal end side reflective film 101 is an example of a second reflective film in the claims, the space-facing region 112C of the distal end side surface 112 of the proximal end side member 110 is an example of a first region in the claims, and the lateral wall-facing region 112P of the distal end side surface 112 of the proximal end side member 110 is an example of a second region in the claims.

Furthermore, the surface (referred to as "bottom surface 124" below) of the plate-shaped portion 121 of the distal end side member 120 facing the airtight space 108 is formed having the distal end side reflective film 102. The distal end side reflective film 102 is configured so as to reflect at least part of the light that is transmitted by the optical transmission medium 200. In the present embodiment, the distal end side reflective film 102 is formed on the entire bottom surface 124 of the plate-shaped portion 121 of the distal end side member 120. The bottom surface 124 of the plate-shaped portion 121 of the distal end side member 120 is, in other words, a surface of the diaphragm portion 128 facing the airtight space 108. As a result, it can be said that the distal end side reflective film 102 is formed on the entire surface of the diaphragm portion 128 facing the airtight space 108. Furthermore, in the present embodiment, the distal end side reflective film 102 is formed on the inner peripheral surface of the lateral wall portion 126 in addition to the bottom surface 124. The distal end side reflective film 102 is an example of a first reflective film in the claims.

The thickness T1 of the proximal end side reflective film 101 and the thickness T2 of the distal end side reflective film 102 are, for example, approximately 1 to 50 nm. However, in the present embodiment, of the proximal end side reflective film 101 and the distal end side reflective film 102, the thickness T2 of the distal end side reflective film 102, which is the reflective film whose distance is further away from the optical transmission medium 200, is thicker than the thickness T1 of the proximal end side reflective film 101, which is the reflective film whose distance is closer to the optical transmission medium 200.

The optical pressure sensor 12*b* of the third embodiment can be manufactured by the same method (see FIGS. 4 and 5) as the manufacturing method of the optical pressure sensor 12 of the first embodiment described above. However, as described above, in the optical pressure sensor 12*b* according to the third embodiment, because the proximal end side member 110 is a substantially circular plate-shaped member, and the distal end side member 120 is a bottomed cylindrical member, the manufacturing method is different in this respect.

Because the optical pressure sensor 12*b* according to the third embodiment has the same configuration as the optical pressure sensor 12 according to the first embodiment, like the optical pressure sensor 12 according to the first embodiment, the maximum reflection intensity can be obtained by the proximal end side reflective film 101, and the occurrence of a misalignment in the formation position of the proximal end side reflective film 101 in the space-facing region 112C of the distal end side surface 112 can be avoided, which enables the measurement accuracy of the optical pressure sensor 12*b* to be sufficiently improved.

Furthermore, because the manufacturing method of the optical pressure sensor 12*b* according to the third embodiment is the same method as the manufacturing method of the optical pressure sensor 12 according to the first embodiment described above, it is possible to suppress the occurrence of thermal strain in each member when manufacturing the optical pressure sensor 12*b*, and a reduction in the quality of the optical pressure sensor 12*b* caused by an outflow of a molten material or an adhesive can be suppressed, and further, an improvement in the efficiency of manufacturing the optical pressure sensor 12*b* can be realized.

D. Modifications

The technique disclosed herein is not limited to the embodiments described above, and various modifications can be made within a scope that does not depart from the gist thereof. For example, the following modifications can be made.

Figure 10:
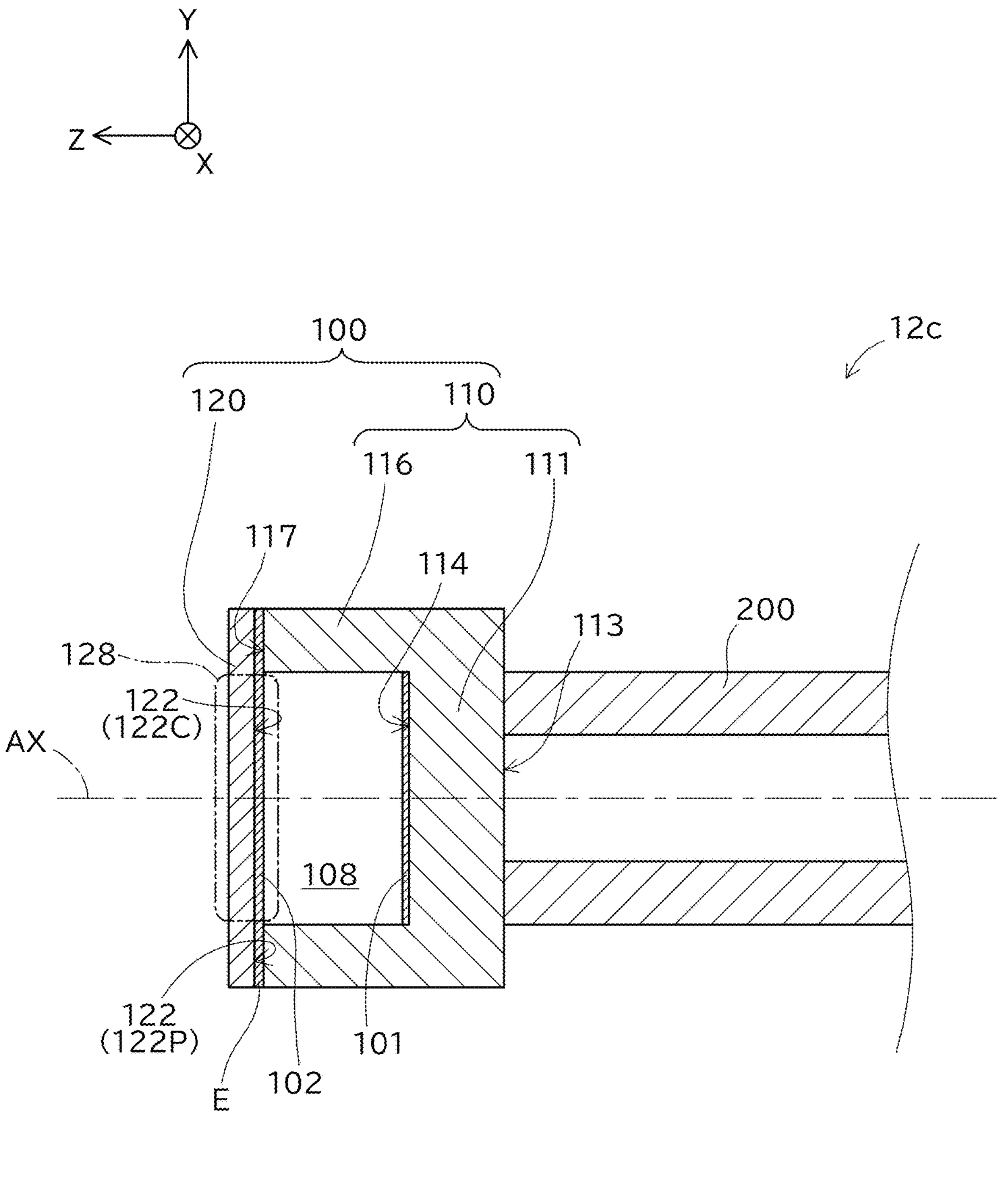
FIG. 10 is an explanatory diagram schematically showing a configuration of an optical pressure sensor of a first modification.

The configuration of the pressure sensor-equipped guide wire 10 in the embodiments described above, and the configuration of the optical pressure sensor 12 constituting the pressure sensor-equipped guide wire 10 are merely examples, and various modifications can be made. FIG. 10 is an explanatory diagram schematically showing a configuration of an optical pressure sensor 12*c* of a first modification. In the optical pressure sensor 12*c* of the first modification shown in FIG. 10, the proximal end side reflective film 101 is formed on the entire bottom surface 114 of the plate-shaped portion 111 of the proximal end side member 110, but is not formed on the inner peripheral surface of the lateral wall portion 116. In this way, the proximal end side reflective film 101 does not have to be formed on the inner peripheral surface of the lateral wall portion 116 of the proximal end side member 110.

Figure 11:
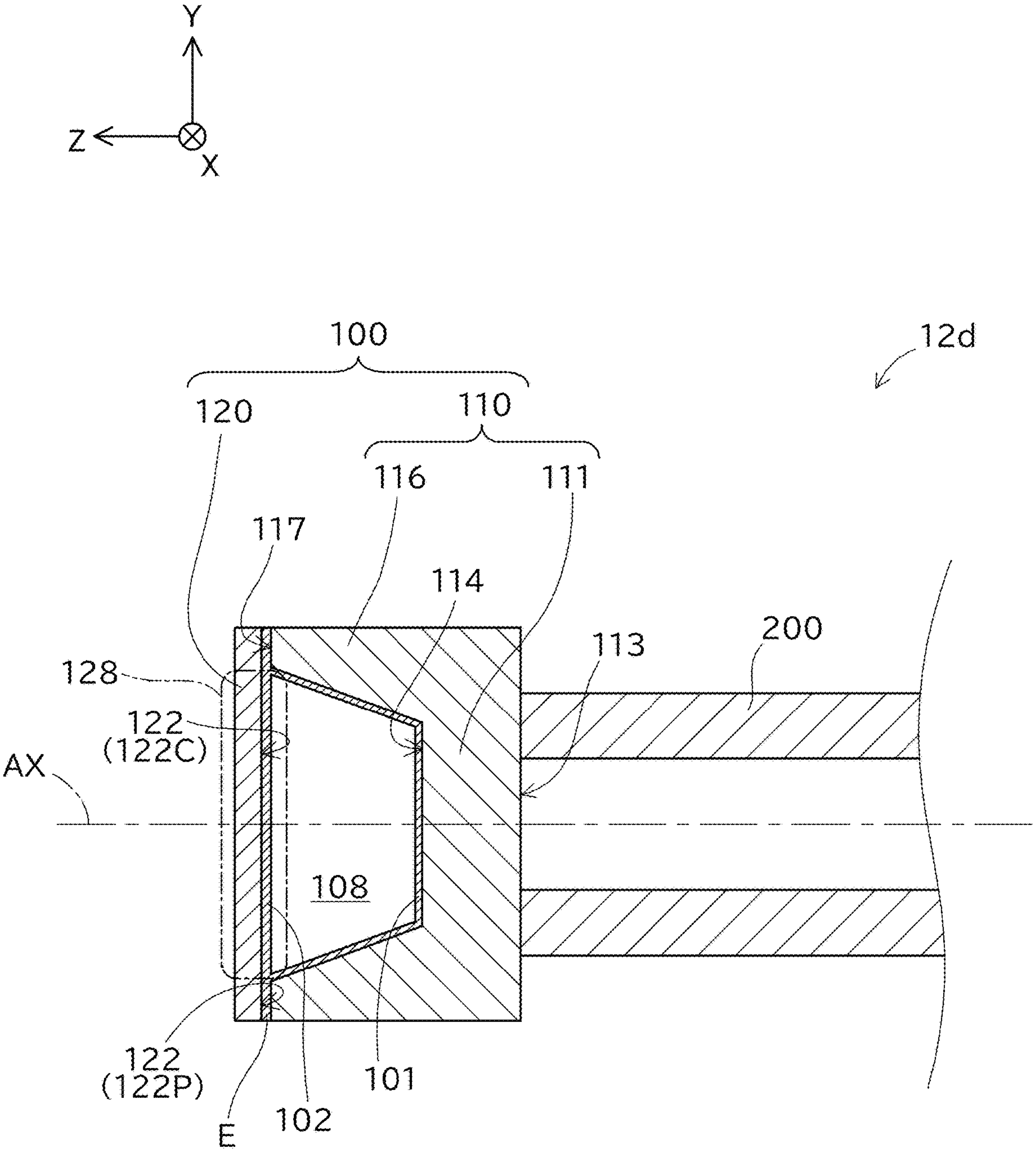
FIG. 11 is an explanatory diagram schematically showing a configuration of an optical pressure sensor of a second modification.

FIG. 11 is an explanatory diagram schematically showing a configuration of an optical pressure sensor 12*d* of a second modification. In the optical pressure sensor 12*d* of the second modification shown in FIG. 11, the inner peripheral surface of the lateral wall portion 116 of the proximal end side member 110 is inclined with respect to the central axis AX, and as a result, the radius of the airtight space 108 increases toward the distal end side. Note that, such a mode can be realized by, for example, performing isotropic etching with respect to a substantially columnar member, being the material forming the proximal end side member 110, and forming a recess whose diameter becomes smaller at positions closer to the lateral wall portion 116 as the recess for forming the airtight space 108. In this way, it is not necessary for the lateral wall portion 116 of the proximal end side member 110 to have a wall shape that is parallel to the central axis AX, and may have any shape as long as the wall shape extends toward the distal end side from the plate-shaped portion 111 of the proximal end side member 110.

Figure 12:
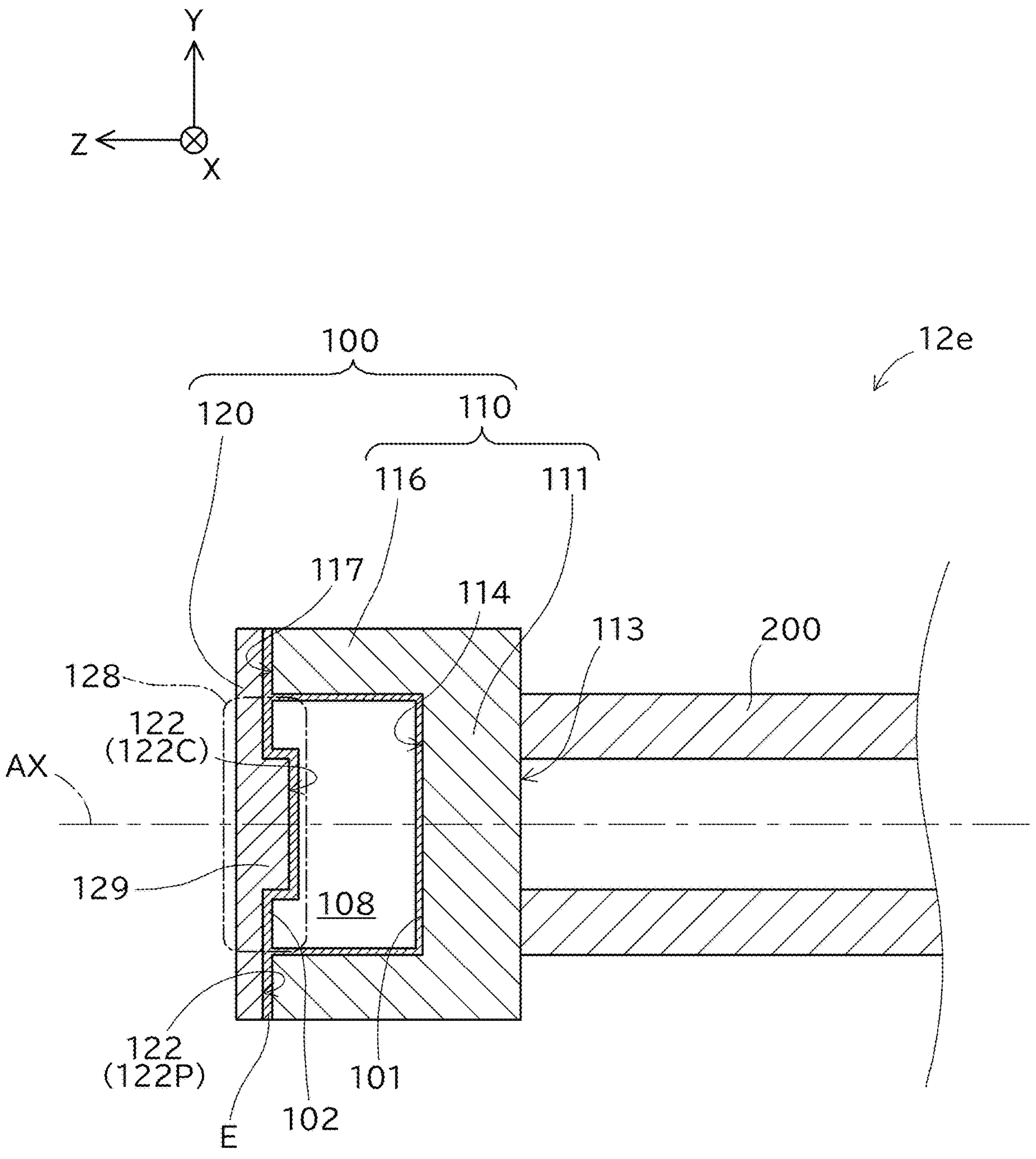
FIG. 12 is an explanatory diagram schematically showing a configuration of an optical pressure sensor of a third modification.

FIG. 12 is an explanatory diagram schematically showing a configuration of an optical pressure sensor 12*e* of a third modification. In the optical pressure sensor 12*e* of a third modification shown in FIG. 12, a center portion of the proximal end side surface 122 of the distal end side member 120 is formed having a protrusion 129 that projects toward the proximal end side, and as a result, the thickness of the center portion of the diaphragm portion 128 is thicker. According to the optical pressure sensor 12*e* of the third modification shown in FIG. 12, even when the diaphragm portion 128 is deformed due to an external pressure, because the center portion of the diaphragm portion 128 is able to maintain the state of being orthogonal to the central axis AX, it is possible for the surface of the distal end side reflective film 102 formed on the center portion of the diaphragm portion 128 to maintain the state of being orthogonal to the central axis AX, and as a result, the reflection direction of the light by the distal end side reflective film 102 can be maintained in a direction parallel to the central axis AX, and the measurement accuracy of the external pressure based on the interference peak wavelength of the multiple reflections of the light in the airtight space 108 can be improved.

In the embodiments described above, although the proximal end side member 110 is configured by the plate-shaped portion 111 and the lateral wall portion 116, the proximal end side member 110 may include other parts in addition to the plate-shaped portion 111 and the lateral wall portion 116. Furthermore, although the entire distal end surface 117 of the lateral wall portion 116 of the proximal end side member 110 is joined to the distal end side member 120, only a portion of the region of the distal end surface 117 of the lateral wall portion 116 of the proximal end side member 110 may be joined to the distal end side member 120. In addition, in the embodiments described above, although the distal end side member 120 as a whole constitutes a plate-shaped portion, the distal end side member 120 may also include other parts in addition to the plate-shaped portion. Moreover, although the entire peripheral edge portion of the proximal end side surface 122 of the distal end side member 120 is joined to the proximal end side member 110, only a portion of the peripheral edge portion of the proximal end side surface 122 of the distal end side member 120 may be joined to the proximal end side member 110.

In the embodiments described above, the magnitude relationship between the thickness T1 of the proximal end side reflective film 101 and the thickness T2 of the distal end side reflective film 102 can be arbitrarily changed, and for example, the thickness T1 of the proximal end side reflective film 101 and the thickness T2 of the distal end side reflective film 102 can be made the same. Furthermore, the proximal end side reflective film 101 and/or the distal end side reflective film 102 may have a multilayer structure. For example, the proximal end side reflective film 101 may have a two-layer structure of a Si layer and an Au layer, and the distal end side reflective film 102 may have a single Si layer. In this case, the side of the proximal end side reflective film 101 that makes contact with the distal end side reflective film 102 is the Si layer, so that the proximal end side reflective film 101 and the distal end side reflective film 102 function as joining thin films for atomic diffusion bonding.

The manufacturing method of the optical pressure sensor 12 in the embodiments described above is merely an example, and various modifications can be made. For example, in the manufacturing method of the optical pressure sensor 12 in the embodiments described above, the polishing step (S120) is performed, but the polishing step may be omitted.

In the embodiments described above, although the pressure sensor-equipped guide wire 10 provided with the optical pressure sensor 12 has been described as an example, the optical pressure sensor 12 disclosed herein is not limited to being installed to a guide wire, and can be installed to other types of medical devices and devices other than those for medical use.

The optical pressure sensor described above may be configured such that, of the first reflective film and the second reflective film, a thickness of the reflective film whose distance is further away from the optical transmission medium is thicker than a thickness of the reflective film whose distance is closer to the optical transmission medium. According to this optical pressure sensor, the light that undergoes multiple reflections in the airtight space can be suppressed from being transmitted through the reflective film whose distance is further away from the optical transmission medium, and therefore, a reduction in the measurement accuracy of the optical pressure sensor caused by the transmission can be suppressed. Furthermore, according to this optical pressure sensor, because the thickness of the reflective film whose distance is closer to the optical transmission medium can be made relatively thin, the amount of light that is transmitted through the reflective film and reaches the inside of the airtight space can be increased, and as a result, the peak value of the interference wavelength of the multiple reflections can be increased, and the measurement accuracy of the optical pressure sensor can be improved.

The optical pressure sensor described above may be configured such that, of the first reflective film and the second reflective film, a thickness of the reflective film whose distance is closer to the optical transmission medium is thicker than a thickness of the reflective film whose distance is further away from the optical transmission medium. According to this optical pressure sensor, the reflective film that is formed on the diaphragm portion, which is a very thin plate-shaped part, can be made relatively thin, and the thermal stress caused by a difference in thermal expansion between the diaphragm portion and the reflective film can be reduced, and as a result, the occurrence of a decrease in the measurement accuracy of the optical pressure sensor caused by the thermal stress (temperature drift) can be suppressed.

The optical pressure sensor described above may be configured such that the first member and the second member are formed of the same material. According to this optical pressure sensor, the difference in the thermal expansion coefficient between the first member and the second member can be reduced, and it is possible to suppress a reduction in the measurement accuracy of the optical pressure sensor caused by the difference in the thermal expansion coefficient.

The optical pressure sensor described above may be configured such that a part of the plate-shaped portion of the second member facing the airtight space constitutes a diaphragm portion that is deformed by an external pressure. According to this optical pressure sensor, it is possible to form a reflective film on the entire surface of the diaphragm portion facing the airtight space. Therefore, according to this optical pressure sensor, it is possible to suppress the occurrence of problems such as damage to the diaphragm portion, a decrease in the durability of the diaphragm portion, and a decrease in the measurement accuracy of the optical pressure sensor that occur when the reflective film is formed on only part of the center portion of the surface of the diaphragm portion facing the airtight space.

The optical pressure sensor described above may be configured such that the second reflective film is also formed in the second region in a continuous manner from the first region, which is a region of a surface of the plate-shaped portion of the second member on the first member side. According to this optical pressure sensor, it is possible to effectively suppress the occurrence of problems such as damage to the diaphragm portion, a decrease in the durability of the diaphragm portion, and a decrease in the measurement accuracy of the optical pressure sensor that occur when the reflective film is formed on only part of the center portion of the surface of the diaphragm portion facing the airtight space.

The manufacturing method of an optical pressure sensor described above may further include: a fifth step for polishing the first member side-facing region before the second step; and a sixth step for polishing the second member side-facing region before the third step. According to this manufacturing method of an optical pressure sensor, the joining strength between the first member and the first reflective film, and the joining strength between the second member and the second reflective film can be improved, and as a result, the joining strength between the first member and the second member can be improved.

The manufacturing method of an optical pressure sensor described above may be configured such that the fifth step is a step for polishing the first member side-facing region so as to become a surface roughness Sa of less than 50 nm, and the sixth step is a step for polishing the second member side-facing region so as to become a surface roughness of less than 50 nm. According to this manufacturing method of an optical pressure sensor, the joining strength between the first member and the first reflective film, and the joining strength between the second member and the second reflective film can be effectively improved, and as a result, the joining strength between the first member and the second member can be effectively improved.

The manufacturing method of an optical pressure sensor described above may further include a seventh step for attaching, after the fourth step, an optical transmission medium to a surface on a side opposite to a surface on the airtight space side on one of the plate-shaped portion of the first member and the plate-shaped portion of the second member, and be configured such that the second step and the third step are executed such that, of the first reflective film and the second reflective film, a thickness of the reflective film whose distance is closer to the optical transmission medium in a state after the seventh step is thicker than a thickness of the reflective film whose distance is further away from the optical transmission medium. According to this manufacturing method of an optical pressure sensor, in the manufactured optical pressure sensor, the light that undergoes multiple reflections in the airtight space can be suppressed from being transmitted through the reflective film whose distance is further away from the optical transmission medium, and therefore, a reduction in the measurement accuracy of the optical pressure sensor caused by the transmission can be suppressed. Furthermore, according to this manufacturing method of an optical pressure sensor, in the manufactured optical pressure sensor, because the thickness of the reflective film whose distance is closer to the optical transmission medium can be made relatively thin, the amount of light that is transmitted through the reflective film and reaches the inside of the airtight space can be increased, and as a result, the peak value of the interference wavelength of the multiple reflections can be increased, and the measurement accuracy of the optical pressure sensor can be improved.

The manufacturing method of an optical pressure sensor described above may further include a seventh step for attaching, after the fourth step, an optical transmission medium to a surface on a side opposite to a surface on the airtight space side on one of the plate-shaped portion of the first member and the plate-shaped portion of the second member, and be configured such that the second step and the third step is executed such that, of the first reflective film and the second reflective film, a thickness of the reflective film whose distance is further away from the optical transmission medium in a state after the seventh step is thicker than a thickness of the reflective film whose distance is closer to the optical transmission medium. According to this manufacturing method of an optical pressure sensor, in the manufactured optical pressure sensor, the reflective film that is formed on the diaphragm portion, which is a very thin plate-shaped part, can be made relatively thin, and the thermal stress caused by a difference in thermal expansion between the diaphragm portion and the reflective film can be reduced, and as a result, the occurrence of a decrease in the measurement accuracy of the optical pressure sensor caused by the thermal stress (temperature drift) can be suppressed.

The manufacturing method of an optical pressure sensor described above may be configured such that the specific metal includes at least one of Si, SiC, Al, Cu, Cr, Ni, Ti, and Au. According to this manufacturing method of an optical pressure sensor, the first member and the second member can be joined with more certainty at a temperature that is not excessively high, such as −10° C. or higher and 200° C. or lower.

The manufacturing of an optical pressure sensor described above may be configured such that the first member and the second member are formed of the same material. According to this manufacturing method of an optical pressure sensor, the difference in the thermal expansion coefficient between the first member and the second member can be reduced in the manufactured optical pressure sensor, and it is possible to suppress a reduction in the measurement accuracy of the optical pressure sensor caused by the difference in the thermal expansion coefficient.

DESCRIPTION OF REFERENCE NUMERALS

10: Pressure sensor-equipped guide wire
12: Optical pressure sensor
13: Proximal end side core shaft
15: Distal end side core shaft
15D: Narrow diameter portion
15P: Tapered portion
15F: Flange portion
16: Coil body
17: Distal end side joint portion
18: Through-hole
19: Recess
21: Light source
22: Spectrometer
23: Console
60: Protective substrate
100: Optical element
101: Proximal end side reflective film
102: Distal end side reflective film
108: Airtight space
110: Proximal end side member
110Z: Proximal end side member material
111: Plate-shaped portion
112: Distal end side surface
112C: Space-facing region
112P: Lateral wall-facing region
113: Rear surface
114: Bottom surface
116: Lateral wall portion
117: Distal end surface
118: Recess
120: Distal end side member
120Z: Distal end side member material
121: Plate-shaped portion
122: Proximal end side surface
122C: Space-facing region
122P: Lateral wall-facing region
124: Bottom surface
126: Lateral wall portion
127: Distal end surface
128: Diaphragm portion
129: Protrusion
200: Optical transmission medium
AX: Central axis
E: Edge
Lc: Cavity length

The invention claimed is:

1. An optical pressure sensor, comprising:

a first member including a first plate-shaped portion and a lateral wall portion that extends from the first plate-shaped portion, the first member being an integral member in which the first plate-shaped portion and the lateral wall portion are integrally formed;

a second member including a second plate-shaped portion, the first member and the second member being joined to each other such that:

the first plate-shaped portion faces the second plate-shaped portion, the lateral wall portion has a distal end surface that is joined to a surface of the second plate-shaped portion, and an airtight space is defined by the first and second plate-shaped portions and the lateral wall portion; and an optical transmission medium that is attached to a surface of one of the first and second plate-shaped portions on a side opposite to a surface on a side of the airtight space; wherein a first reflective film that reflects light transmitted by the optical transmission medium is formed on a surface of the first plate-shaped portion facing the airtight space, a surface of the second plate-shaped portion on a side of the first member includes a first region facing the airtight space, and a second region facing the distal end surface of the lateral wall portion of the first member, and a second reflective film that reflects light transmitted by the optical transmission medium is formed on an entirety of the first region.

2. The optical pressure sensor according to claim 1, wherein one of the first reflective film and the second reflective film is thicker than a different one of the first reflective film and the second reflective film, and a distance between the one film and the optical transmission medium is greater than a distance between the different one and the optical transmission medium.

3. The optical pressure sensor according to claim 1, wherein one of the first reflective film and the second reflective film is thicker than a different one of the first reflective film and the second reflective film, and a distance between the one film and the optical transmission medium is less than a distance between the different one and the optical transmission medium.

4. The optical pressure sensor according to claim 1, wherein the first member and the second member are formed of a same material.

5. The optical pressure sensor according to claim 1, wherein a part of the second plate-shaped portion facing the airtight space constitutes a diaphragm portion that is deformable by an external pressure.

6. The optical pressure sensor according to claim 5, wherein the second reflective film is also formed on the second region in a continuous manner from the first region.

7. A manufacturing method of an optical pressure sensor, the method comprising:

preparing a first member including a first plate-shaped portion and a lateral wall portion that extends from the first plate-shaped portion, and a second member including a second plate-shaped portion, wherein the first member and the second member are to be joined to each other such that:

the first plate-shaped portion faces the second plate-shaped portion;

the lateral wall portion has a distal end surface that is joined to a surface of the second plate-shaped portion; and an airtight space is defined by the first and second plate-shaped portions and the lateral wall portion;

forming a first reflective film that reflects light, the first reflective film being formed at a temperature of −10° C. or higher and 200° C. or lower and under a vacuum of less than standard atmospheric pressure, and being formed of a specific metal on a surface of the first plate-shaped portion that is to be arranged to face the second plate-shaped portion, and on the distal end surface of the lateral wall portion of the first member that is to be arranged to face the second plate-shaped portion;

forming a second reflective film that reflects light, the second reflective film being formed at a temperature of −10° C. or higher and 200° C. or lower and under a vacuum of less than standard atmospheric pressure, and being formed of the specific metal on a first region and a second region of a surface of the second plate-shaped portion that is to be arranged on a side of the first member, wherein the first region is surrounded by the second region and is entirely covered by the second reflective film, and the second region is to be arranged to face the distal end surface of the lateral wall portion of the first member; and joining the first member and the second member at a temperature of −10° C. or higher and 200° C. or lower and under a vacuum of less than standard atmospheric pressure, by bringing into contact the distal end surface of the lateral wall portion of the first member, on which the first reflective film has been formed, with the second region of the surface of the second plate-shaped portion, on which the second reflective film has been formed.

8. The manufacturing method according to claim 7, further comprising polishing the distal end surface of the lateral wall portion before forming the first reflective film; and polishing the second region before forming the second reflective film.

9. The manufacturing method according to claim 8, wherein the distal end surface of the lateral wall portion is polished so as to have a surface roughness Sa of less than 50 nm, and the second region is polished so as to have a surface roughness Sa of less than 50 nm.

10. The manufacturing method according to claim 7, further comprising attaching, after joining the first member and the second member, an optical transmission medium to a surface of one of the first and second plate-shaped portions on a side opposite to a surface on a side of the airtight space, wherein the first reflective film and the second reflective film are formed such that, one of the first reflective film and the second reflective film is thicker than a different one of the first reflective film and the second reflective film, and a distance between the one film and the optical transmission medium is greater than a distance between the different one and the optical transmission medium in a state after the optical transmission medium has been attached to the one of the first and second plate-shaped portions.

11. The manufacturing method according to claim 7, further comprising attaching, after joining the first member and the second member, an optical transmission medium to a surface of one of the first and second plate-shaped portions on a side opposite to a surface on a side of the airtight space, wherein the first reflective film and the second reflective film are formed such that one of the first reflective film and the second reflective film is thicker than a different one of the first reflective film and the second reflective film, and a distance between the one film and the optical transmission medium is less than a distance between the different one and the optical transmission medium in a state after the optical transmission medium has been attached to the one of the first and second plate-shaped portions.

12. The manufacturing method according to claim 7, wherein the specific metal includes at least one of Si, SiC, Al, Cu, Cr, Ni, Ti, and Au.

13. The manufacturing method according to claim 9, wherein the first member and the second member are formed of a same material.

14. An optical pressure sensor, comprising:

a first member including a first plate-shaped portion and a lateral wall portion that extends from the first plate-shaped portion;

a second member including a second plate-shaped portion, the first member and the second member being joined to each other such that:

the first plate-shaped portion faces the second plate-shaped portion, the lateral wall portion has a distal end surface that is joined to a surface of the second plate-shaped portion, and an airtight space is defined by the first and second plate-shaped portions and the lateral wall portion; and an optical transmission medium that is attached to a surface of one of the first and second plate-shaped portions on a side opposite to a surface on a side of the airtight space; wherein a first reflective film that reflects light transmitted by the optical transmission medium is formed on a surface of the first plate-shaped portion facing the airtight space and on an inner peripheral surface of the lateral wall portion, a surface of the second plate-shaped portion on a side of the first member includes a first region facing the airtight space, and a second region facing the distal end surface of the lateral wall portion of the first member, and a second reflective film that reflects light transmitted by the optical transmission medium is formed on an entirety of the first region.

15. An optical pressure sensor, comprising:

a first member including a first plate-shaped portion and a lateral wall portion that extends from the first plate-shaped portion;

a second member including a second plate-shaped portion, the first member and the second member being joined to each other such that:

the first plate-shaped portion faces the second plate-shaped portion, the lateral wall portion has a distal end surface that is joined to a surface of the second plate-shaped portion, and an airtight space is defined by the first and second plate-shaped portions and the lateral wall portion; and an optical transmission medium that is attached to a surface of one of the first and second plate-shaped portions on a side opposite to a surface on a side of the airtight space; wherein an inner peripheral surface of the lateral wall portion is inclined relative to a central axis of the optical pressure sensor such that an inner diameter of the airtight space increases toward a distal end, a first reflective film that reflects light transmitted by the optical transmission medium is formed on a surface of the first plate-shaped portion facing the airtight space, a surface of the second plate-shaped portion on a side of the first member includes a first region facing the airtight space, and a second region facing the distal end surface of the lateral wall portion of the first member, and a second reflective film that reflects light transmitted by the optical transmission medium is formed on an entirety of the first region.

16. An optical pressure sensor, comprising:

a first member including a first plate-shaped portion and a lateral wall portion that extends from the first plate-shaped portion;

a second member including a second plate-shaped portion, the first member and the second member being joined to each other such that:

the first plate-shaped portion faces the second plate-shaped portion, the lateral wall portion has a distal end surface that is joined to a surface of the second plate-shaped portion, and an airtight space is defined by the first and second plate-shaped portions and the lateral wall portion; and an optical transmission medium that is attached to a surface of one of the first and second plate-shaped portions on a side opposite to a surface on a side of the airtight space; wherein a first reflective film that reflects light transmitted by the optical transmission medium is formed on a surface of the first plate-shaped portion facing the airtight space, a surface of the second plate-shaped portion on a side of the first member includes a first region facing the airtight space, and a second region facing the distal end surface of the lateral wall portion of the first member, a second reflective film that reflects light transmitted by the optical transmission medium is formed on an entirety of the first region, and a protrusion is formed at a center portion of the surface of the second plate-shaped portion such that a thickness of the center portion of the second plate-shaped portion is increased.

17. The optical pressure sensor according to claim 16, wherein a part of the second plate-shaped portion facing the airtight space constitutes a diaphragm portion that is deformable by an external pressure, and the thickness of the center portion of the diaphragm portion is increased due to the protrusion.

* * * * *